(12) United States Patent
Onggosanusi et al.

(10) Patent No.: US 7,801,247 B2
(45) Date of Patent: *Sep. 21, 2010

(54) MULTIPLE INPUT, MULTIPLE OUTPUT SYSTEM AND METHOD

(75) Inventors: Eko N. Onggosanusi, Dallas, TX (US); Anand G. Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 609 days.

This patent is subject to a terminal disclaimer.

(21) Appl. No.: 10/144,114

(22) Filed: May 13, 2002

(65) Prior Publication Data

US 2003/0210750 A1 Nov. 13, 2003

Related U.S. Application Data

(63) Continuation-in-part of application No. 10/135,611, filed on Apr. 30, 2002, and a continuation-in-part of application No. 10/135,679, filed on Apr. 30, 2002.

(60) Provisional application No. 60/287,998, filed on May 1, 2001, provisional application No. 60/288,209, filed on May 2, 2001.

(51) Int. Cl.
*H04L 27/00* (2006.01)

(52) U.S. Cl. ..................................................... 375/299

(58) Field of Classification Search ......... 375/295–297, 375/299, 219, 135, 130, 146; 455/101
See application file for complete search history.

(56) References Cited

U.S. PATENT DOCUMENTS

| | | | | |
|---|---|---|---|---|
| 6,047,020 A * | 4/2000 | Hottinen | .................... | 375/130 |
| 6,058,105 A * | 5/2000 | Hochwald et al. | ........... | 370/310 |
| 6,112,095 A * | 8/2000 | Wax et al. | ................ | 455/456.1 |
| 6,128,330 A * | 10/2000 | Schilling | .................... | 375/141 |
| 6,131,016 A * | 10/2000 | Greenstein et al. | ............ | 455/69 |
| 6,178,196 B1 * | 1/2001 | Naguib et al. | ............... | 375/148 |
| 6,317,411 B1 * | 11/2001 | Whinnett et al. | ............ | 370/204 |
| 6,327,303 B1 * | 12/2001 | Balogh et al. | ............... | 375/240 |
| 6,351,499 B1 * | 2/2002 | Paulraj et al. | ............... | 375/267 |
| 6,510,173 B1 * | 1/2003 | Garmonov et al. | .......... | 375/141 |
| 6,542,556 B1 * | 4/2003 | Kuchi et al. | ................. | 375/299 |
| 6,643,333 B1 * | 11/2003 | Jung et al. | .................. | 375/295 |
| 6,721,300 B1 * | 4/2004 | Akiba et al. | ................ | 370/342 |
| 6,757,322 B2 * | 6/2004 | Schilling | .................... | 375/141 |
| 6,850,481 B2 * | 2/2005 | Wu et al. | .................... | 370/208 |
| 6,891,897 B1 * | 5/2005 | Bevan et al. | ................ | 375/265 |

(Continued)

OTHER PUBLICATIONS

Liang et al "Downlink Channel Covariance Matrix (DCCM) Estimation and its Applications in Wireless DS-CDMA Systems", IEEE Journal on Selected Area in Communications, vol. 19, No. 2, Feb. 2001,pp. 222-232.*

*Primary Examiner*—David C Payne
*Assistant Examiner*—Vineeta S Panwalkar
(74) *Attorney, Agent, or Firm*—Ronald O Neerings; Wade James Brady, III; Frederick J. Telecky, Jr.

(57) ABSTRACT

A linear transformation of parallel multiple input, multiple output (MIMO) encoded streams; also, space-time diversity and asymmetrical symbol mapping of parallel streams. Separately or together, these improve error rate performance as well as system throughput. Preferred embodiments include CDMA wireless systems with multiple antennas.

16 Claims, 12 Drawing Sheets

U.S. PATENT DOCUMENTS 6,898,248 B1 * 5/2005 Elgamal et al. ............. 375/259
2001/0033622 A1 * 10/2001 Jongren et al. ............. 375/267
2001/0053143 A1 * 12/2001 Li et al. ..................... 370/344
2002/0172293 A1 * 11/2002 Kuchi et al. ................ 375/267

* cited by examiner

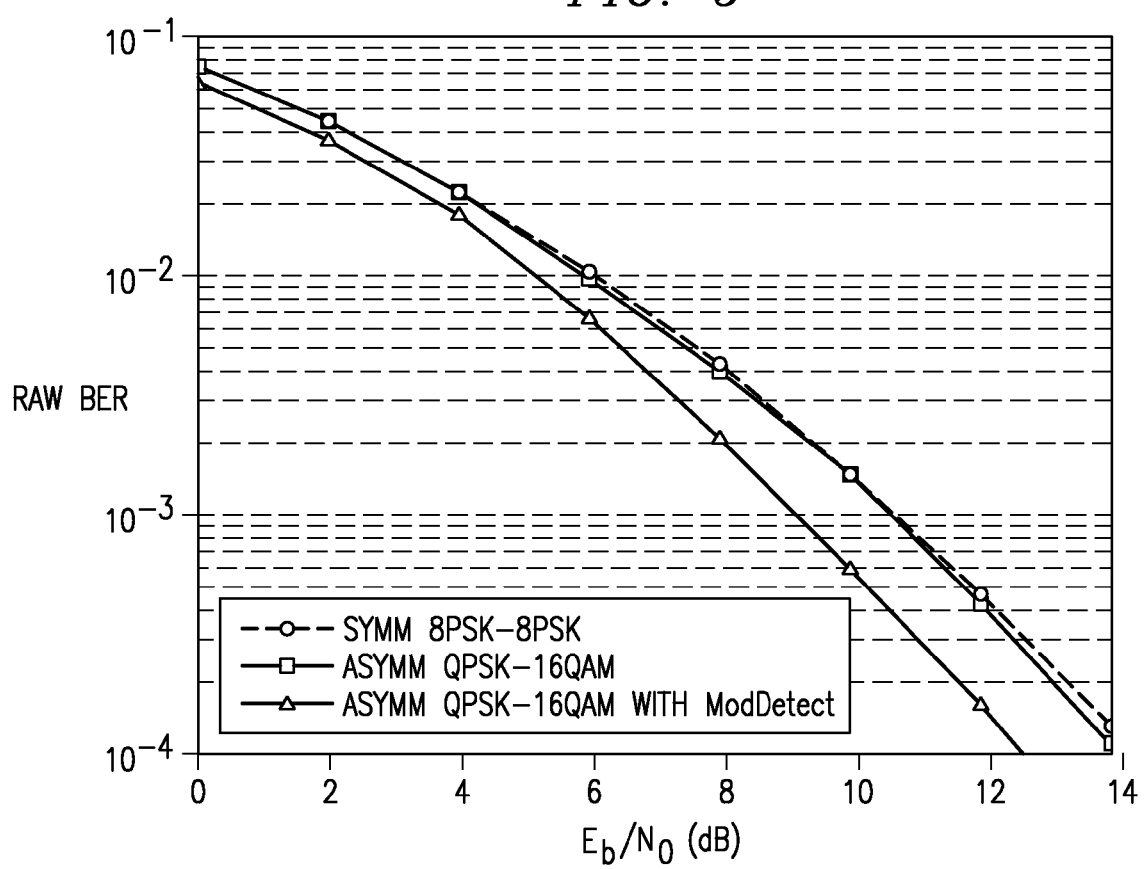

MULTIPLE INPUT, MULTIPLE OUTPUT SYSTEM AND METHOD

CROSS-REFERENCE TO RELATED APPLICATIONS

This application is a continuation-in-part from parent application Ser. Nos. 10/135,611 (TI-32969) and 10/135,679 (TI-32970), filed Apr. 30, 2002 and claims priority from provisional application Ser. Nos. 60/287,998, filed May 1, 2001 and 60/288,209, filed May 2, 2001.

BACKGROUND OF THE INVENTION

The present invention relates to wireless digital communications, and more particularly to space-time diversity transmission systems and methods.

Spread spectrum wireless communications utilize a radio frequency bandwidth greater than the minimum bandwidth required for the transmitted data rate, but many users may simultaneously occupy the bandwidth. Each of the users has a pseudo-random code for "spreading" information to encode it and for "despreading" (by correlation) received spread spectrum signals and recovery of information. Such multiple access typically appears under the name of code division multiple access (CDMA). The pseudo-random code may be an orthogonal (Walsh) code, a pseudo-noise (PN) code, a Gold code, or combinations (modulo-2 additions) of such codes. After despreading the received signal at the correct time instant, the user recovers the corresponding information while other users' interfering signals appear noise-like. For example, the interim standard IS-95 for such CDMA communications employs channels of 1.25 MHz bandwidth and a pseudo-random code pulse (chip) interval $T_c$ of 0.8138 microsecond with a transmitted symbol (bit) lasting 64 chips. The recent 3GPP wideband CDMA (WCDMA) proposal employs a 3.84 MHz bandwidth and the CDMA code length applied to each information symbol may vary from 4 chips to 256 chips. Indeed, UMTS (universal mobile telecommunications system) approach UTRA (UMTS terrestrial radio access) provides a spread spectrum cellular air interface with both FDD (frequency division duplex) and TDD (time division duplex) modes of operation. UTRA currently employs 10 ms duration frames partitioned into 15 time slots with each time slot consisting of 2560 chips ($T_c$=0.26 microsecond).

The air interface leads to multipath reception, so a RAKE receiver has individual demodulators (fingers) tracking separate paths and combines the finger results to improve signal-to-noise ratio (SNR). The combining may use a method such as the maximal ratio combining (MRC) in which the individual detected signals in the fingers are synchronized and weighted according to their signal strengths or SNRs and summed to provide the decoding. That is, a RAKE receiver typically has a number of DLL or TDL code tracking loops together with control circuitry for assigning tracking units to the strongest received paths. Also, an antenna array could be used for directionality by phasing the combined signals from the antennas.

Further, UTRA allows for space-time block-coding-based transmit antenna diversity (STTD) in which, generically, channel bits $b_0$, $b_1$, $b_2$, $b_3$ (values ±1) are transmitted as the sequence $b_0$, $b_1$, $b_2$, $b_3$ by antenna 1 and simultaneously transmitted as the sequence $-b_2$, $b_3$, $b_0$, $-b_1$ by antenna 2. Note that interpreting ($b_0$, $b_1$) and ($b_2$, $b_3$) as two complex numbers (e.g., QPSK or QAM symbols) implies the sequence transmitted by antenna 2 differs from the sequence from antenna 1 by a rotation of $\pi/2$ in a two-complex-dimensional space followed by complex conjugation.

STTD is a diversity technique in the sense that it provides redundancy for the transmitted symbols. Recently, efforts in standardization of high speed downlink packet access (HSDPA) in WCDMA have taken place. The use of multiple antennas at the transmitter as well as the receiver is considered as a candidate technology. While STTD fits nicely in the grand scheme, STTD does not provide any increase in data rate relative to the current WCDMA systems.

Naguib et al, Increasing Data Rate over Wireless Channels, IEEE Signal Proc. Mag. 76 (May 2000) considers multiple antennas for both transmitter and receiver together with synchronous cochannel space-time coding (STTD) and interference cancellation. This approach can be adopted for HSDPA systems with 4 antennas at the base station, where each of the two pairs of antennas transmits one distinct data stream. This results in the transmission of two independent data streams, and thus doubles the system data rate as well as capacity. This scheme is thus double STTD (DSTTD) for a 4-antenna transmitter, or multiple STTD for a 2n-antenna transmitter with n>2.

For high data rate systems, the performance of a scheme can be evaluated based on the error rate (bit error rate, symbol error rate, frame error rate) as well as system throughput (the total data rate the system can support). While double/multiple STTD provides increased data rate and reasonably good performance, it can still be improved in some circumstances.

For practical wireless communication systems employing multiple antennas, small inter-element spacing is desirable. However, this often results in large correlation between the channel parameters especially when the channel angular spread is small. For high data rate schemes such as double/multiple STTD, high channel correlation results in significant performance loss due to the loss in diversity gain as well as decrease in the ability to separate multiple independent data streams.

SUMMARY OF THE INVENTION

The present invention provides encoding/decoding with a channel adapting linear transform of parallel multiple input, multiple output streams.

This has the advantages including increased performance (in terms of error rate and system throughput) for wireless communications.

BRIEF DESCRIPTION OF THE DRAWINGS

The drawings are heuristic for clarity.

FIGS. 5-9 present simulation results.

DESCRIPTION OF THE PREFERRED EMBODIMENTS

1. Overview

FIGS. 1a-1d are flow diagrams for preferred embodiment transmission and reception methods which include transmission using linear transformations of parallel symbol streams with space-time transmit diversity (STTD) encoding for multiple transmission antennas. Reception responds to the linear transformation. Alternative preferred embodiment double/multiple STTD encoding uses differing constellations for differing symbols streams with or without the linear transformation. The linear transformation adapts to the transmission channel conditions in order to make the transformed channel matrix formally approximate that of an independent identically distributed channel; this enhances channel capacity and system performance by compensating for high correlation of transmission channel coefficients as may arise from small spacing of transmitter antennas. The linear transformation is updated to adapt to changing channel conditions. Preferred embodiment approaches for simplifying the linear transformation computation include restriction of the linear transformation to a permutation or quantization of its elements.

Figure 2A:
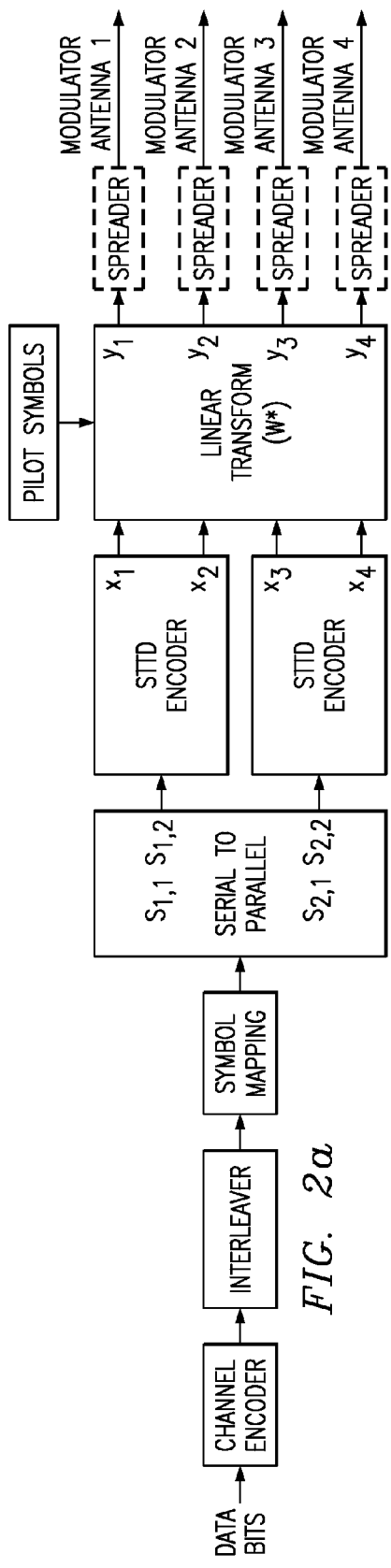
FIGS. 2a-2g illustrate preferred embodiment transmitter and receivers.
Figure 2B:
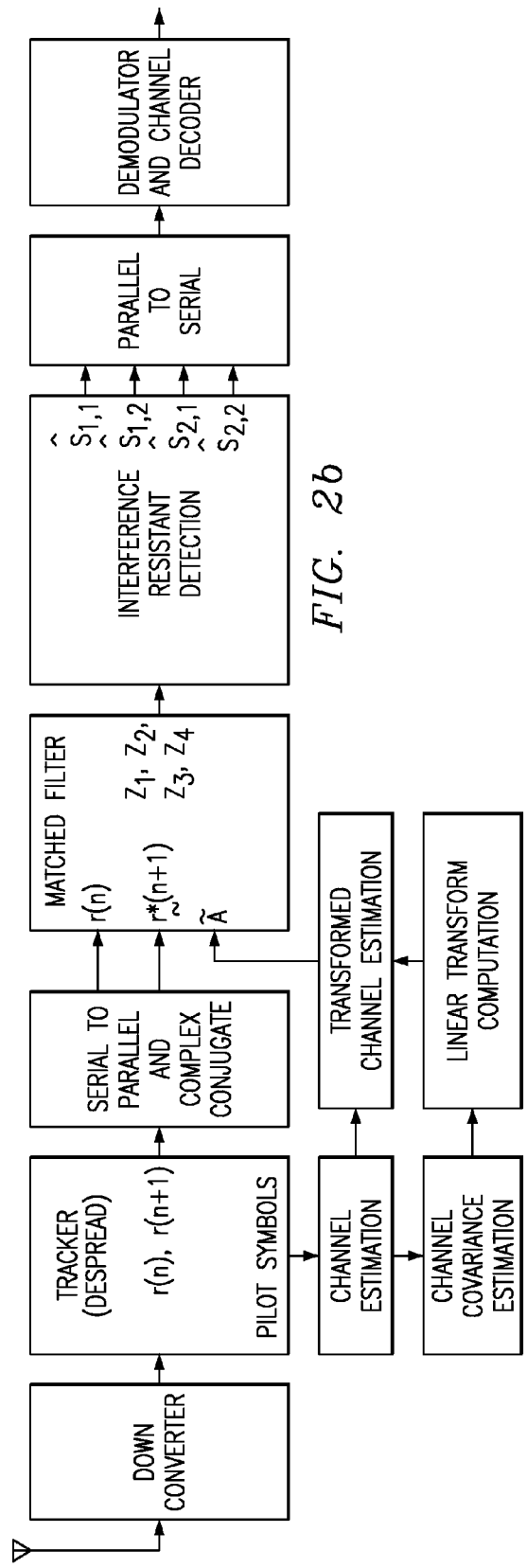
Figure 2C:
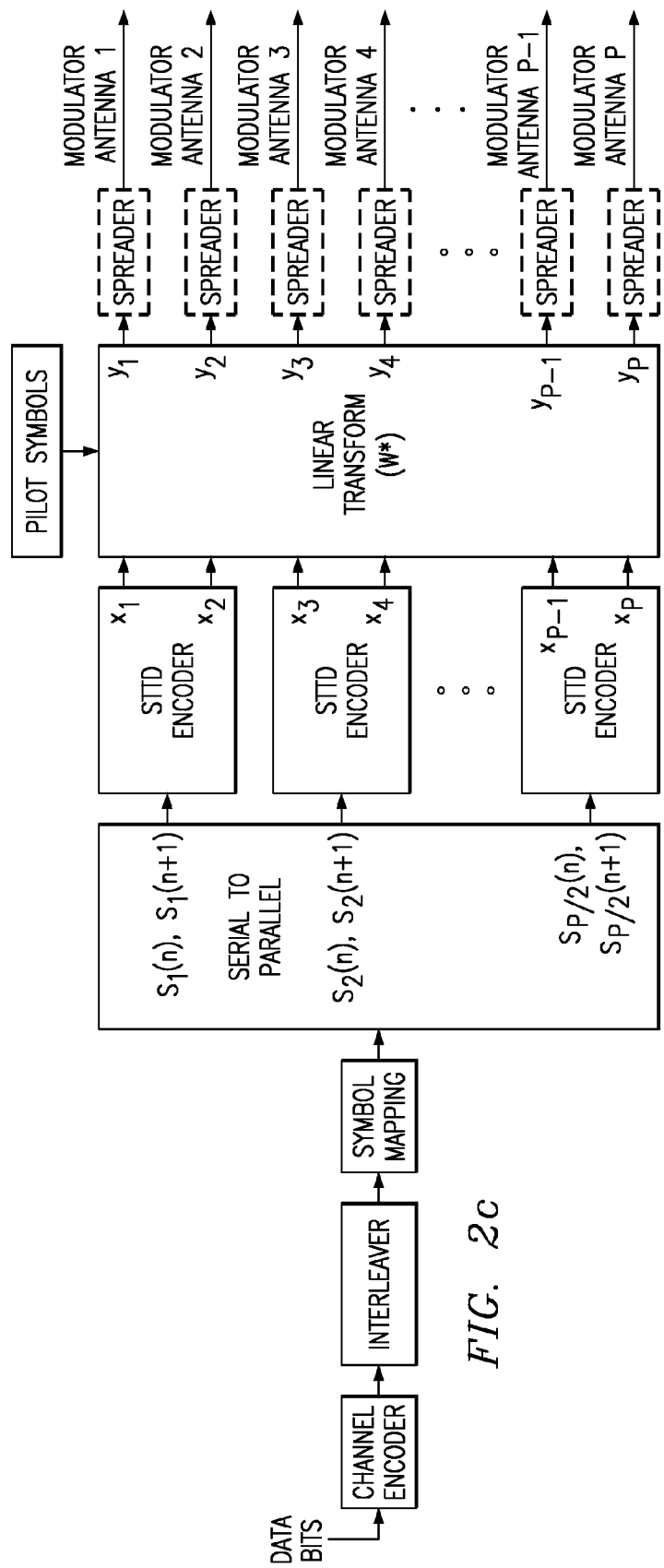

Preferred embodiment communications systems use preferred embodiment encoding and decoding methods, and FIGS. 2a-2c illustrate preferred embodiment transmitter and receiver functional blocks.

In preferred embodiment communications systems base stations and mobile users could each include one or more digital signal processors (DSPs) and/or other programmable devices with stored programs for performance of the signal processing of the preferred embodiment methods. Alternatively, specialized circuitry could be used. The base stations and mobile users may also contain analog integrated circuits for amplification of inputs to or outputs from antennas and conversion between analog and digital; and these analog and processor circuits may be integrated as a system on a chip (SoC). The stored programs may, for example, be in ROM or flash EEPROM integrated with the processor or external. The antennas may be parts of receivers with multiple finger RAKE detectors for each user's signals. Exemplary DSP cores could be in the TMS320C6xxx or TMS320C5xxx families from Texas Instruments.

2. Four Transmit Antennas with one Receive Antenna Preferred Embodiments

FIG. 2a illustrates a first preferred embodiment transmitter which encodes two symbol streams ($s_1$ and $S_2$) with an STTD encoder for each stream and transmits with four antennas, two antennas for each STTD encoder. This could be a base station transmitter in a cellular wireless system. FIG. 2b illustrates a preferred embodiment receiver with one antenna for reception, such as for a mobile user in a cellular wireless system. Preferred embodiments in subsequent sections include general antenna arrangements. A base station may include the channel estimation and linear transformation computation as in FIG. 2b.

The FIG. 2a transmitter may operate according to the FIG. 1a flow as follows. Presume a block of data bits (with FEC) is channel encoded, block interleaved, and mapped to a block of symbols: . . . , $s_1(n)$, $s_2(n)$, $s_1(n+1)$, $s_2(n+1)$, $s_1(n+2)$, $s_2(n+2)$, $s_1(n+3)$, $s_2(n+3)$, . . . , where each symbol $s_j(k)$ is interpreted as a discrete complex number (e.g., QPSK, QAM, . . . ). The serial-to-parallel converter sends the stream . . . , $s_1(n)$, $s_1(n+1)$, $s_1(n+2)$, $s_1(n+3)$, . . . to the upper STTD encoder and the stream . . . , $s_2(n)$, $s_2(n+1)$, $s_2(n+2)$, $s_2(n+3)$, . . . to the lower STTD encoder. The upper STTD encoder has two outputs streams: . . . , $x_1(n)$, $x_1(n+1)$, $x_1(n+2)$, $x_1(n+3)$, . . . , and . . . , $x_2(n)$, $x_2(n+1)$, $x_2(n+2)$, $x_2(n+3)$, . . . , where pairwise the $x_j(\,)$s are equal to the $s_1(\,)$s: $x_1(n)=s_1(n)$, $x_1(n+1)=s_1(n+1)$ and $x_2(n)=-s_1^*(n+1)$, $x_2(n+1)=s_1^*(n)$. That is, the $x_1$ stream is just the $s_1$ stream and the $x_2$ stream is the pairwise rotation in two-complex-dimensional space of the $s_1$ stream. Analogously, the lower STTD encoder has two outputs streams: . . . $x_3(n)$, $x_3(n+1)$, $x_3(n+2)$, $x_3(n+3)$, . . . , and . . . , $x_4(n)$, $x_4(n+1)$, $x_4(n+2)$, $x_4(n+3)$, . . . where again pairwise the $x_j(\,)$s are equal to the $s_2(\,)$s: $x_3(n)=s_2(n)$, $x_3(n+1)=s_2(n+1)$ and $x_4(n)=-s_2^*(n+1)$, $x_4(n+1)=s_2^*(n)$.

The W block linearly transforms the four streams $x_1(n)$, $x_2(n)$, $x_3(n)$, $x_4(n)$ into the four streams $y_1(n)$, $y_2(n)$, $y_3(n)$, $y_4(n)$; that is, W transforms four symbol streams into four streams of linear combinations of symbols. W adapts to transmission channel conditions as described below; and the choice of W enhances channel capacity. Note that the flow of FIG. 1a presumes that the transmitter also receives signals in the same channel as its transmissions so that the transmitter can estimate the physical channel coefficients and compute W; otherwise, the transmitter must obtain W from the receiver to which it transmits. For the case of a CDMA system each of the four outputs $y_j(n)$ is next spread (multiplied by a common spreading code). Then the (spread) transformed-symbol streams drive modulators (pulse generators (at the chip rate) with essentially cosine and sine pulses for the real (in phase) and imaginary (quadrature) components of the (spread) $y_j(n)$) which modulate the carrier wave radiated by the corresponding transmitter antennas. For preferred embodiments not using CDMA, omit the spreading and operate the pulse generators at the symbol rate. For an OFDM (orthogonal frequency division multiplexing) system each sub-carrier (tone) would have its own double/multiple STTD and linear transformation.

Figure 1A:
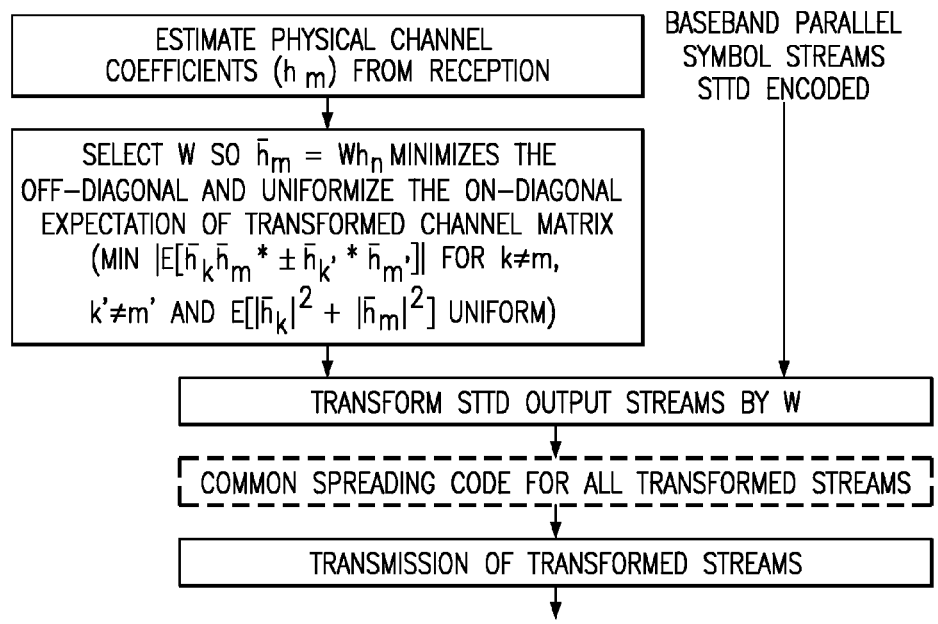
FIGS. 1a-1d are flow diagrams.
Figure 1B:
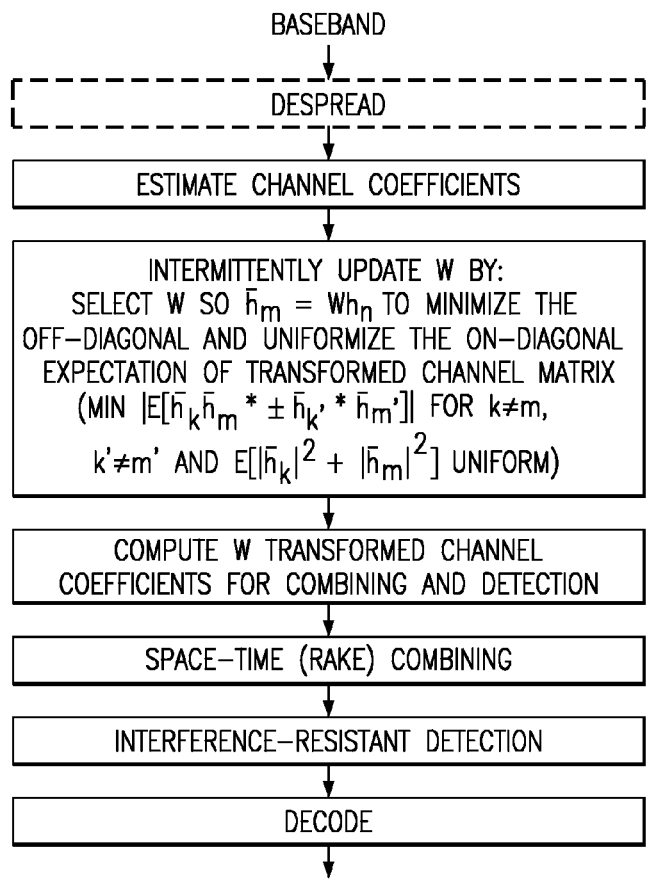

FIG. 2b illustrates a first preferred embodiment receiver with one antenna which operates as indicated by FIG. 1b. The antenna connects to a down-converter which drives a RAKE detector having one or more tracking fingers (including a sub-chip-rate sampler for A/D conversion, early-late chip synchronizer with despreading correlator, path channel estimation) to track resolvable received multipath signals, and the multipath detected signals may be combined using SNR weights. All four transmitter spreaders use the same spreading code; this increases capacity in that other spreading codes may be used for other data streams. Small spacing among the four transmitter antennas implies high correlation among the transmission channel coefficients in that each path from one transmitter antenna likely has corresponding highly correlated paths from the other three transmitter antennas. This also implies near synchrony of the received symbols from the four transmitter antennas along four highly correlated paths and a single despreader captures all four paths in a receiver RAKE finger. Of course, the channel coefficients for the four highly-correlated paths must differ somewhat in order to distinguish the $s_1$ and $S_2$ symbols; and the linear transformation W effectively utilizes these differences. Preferred embodiment receivers with two or more antennas (see below) provide further channel coefficient variety.

Denote the received (despread) baseband signal for symbol interval n as $$r(n)=h_1y_1(n)+h_2y_2(n)+h_3y_3(n)+h_4y_4(n)+w(n)$$

where $h_m$ is the baseband channel coefficient for the channel path(s) from the mth transmitter antenna to the receiver antenna and w(n) is channel white noise. Note that the $h_m$ vary with n, but this variation is slow and thus ignored (except for channel estimation updates) and not explicit in the notation. Estimate the $h_m$ by intermittently transmitting pilot symbols from each of the four transmitter antennas; FIG. 2b indicates channel estimation.

First analyze the receiver in the simplest case of the $y_m(n)=x_m(n)$, which corresponds to the transformation matrix $W=I_4$ (the 4×4 identity matrix). That is, consider:

$$r(n) = h_1 x_1(n) + h_2 x_2(n) + h_3 x_3(n) + h_4 x_4(n) + w(n)$$
$$= h_1 s_1(n) + h_2(-s_1^*(n+1)) + h_3 s_2(n) + h_4(-s_2^*(n+1)) + w(n)$$

and so $$r^*(n+1) = h_1^* x_1^*(n+1) + h_2^* x_2(n) + h_3^* x_3^*(n+1) + h_4^* x_4(n+1) + w^*(n+1)$$
$$= h_1^* s_1^*(n+1) + h_2^* s_1(n) + h_3^* s_2^*(n+1) + h_4^* s_2(n) + w^*(n+1)$$

This can be expressed in terms of 2-vectors and 2×2 matrices as:

$$r = A_1 s_1 + A_2 s_2 + w$$

where r is the 2-vector of components r(n), r*(n+1); $s_1$ is the 2-vector of components $s_1(n)$, $s_1^*(n+1)$; $s_2$ is the 2-vector of components $s_2(n)$, $S_2^*(n+1)$; $A_1$ is a 2×2 matrix corresponding to the channel path(s) of the upper pair of transmitter antennas in FIG. 2a to the receiver antenna with the first row of $A_1$ equal $h_1$, $-h_2$ and second row $h_2^*$, $h_1^*$; $A_2$ is a 2×2 matrix corresponding to the channel path(s) of the lower pair of transmitter antennas to the receiver antenna with the first row $h_3$, $-h_4$ and second row $h_4^*$, $h_3^*$; and w is a 2-vector with white noise components.

The notation can be further compressed with the following definitions: 4×1 vector s as the vertical concatenation of $s_1$ and $S_2$; and 2×4 matrix A as the horizontal concatenation of $A_1$ and $A_2$ (thus the first row of A is [$h_1$, $-h_2$, $h_3$, $-h_4$] and the second row is [$h_2^*$, $h_1^*$, $h_4^*$, $h_3^*$]). With these definitions:

$$r = A s + w$$

The matrix A is the 2×4 effective channel coefficient matrix of the channel from the four transmitter antennas to the receiver antenna.

The two signals transmitted by the two transmitter antennas fed from the same STTD encoder (e.g., $x_1$ and $x_2$ or $x_3$ and $X_4$) will not interfere with each other due to the orthogonality provided by the STTD encoding. Indeed, at receiver antenna 1 the portion of the 2-vector [r(n), r(n+1)] from transmitter antenna 1 is [$h_1 s_1(n)$, $h_1 s_1(n+1)$] and the portion from transmit antenna 2 is [$-h_2 s_1^*(n+1)$, $h_2 s_1^*(n)$], and the complex inner product of these two vectors is $h_1 s_1(n)\{-h_2 s_1^*(n+1)\}^* + h_1 s_1(n+1)\{h_2 s_1^*(n)\}^* = 0$. However, any combination of two signals coming from different STTD encoders interfere with each other and need to be separated using an interference resistant detector. Some examples of interference resistant detection scheme are the maximum likelihood (which is optimal) detection, linear detection (zero forcing or minimum mean square error (MMSE)), and iterative detection (zero forcing or MMSE). Both linear and iterative detectors are based on the idea of interference suppression and/or cancellation.

Since the matrix A is 2×4, linear and iterative detectors are not applicable in this scenario. The maximum likelihood detector, however, can still be utilized. In general, a maximum likelihood detection estimates the transmitted symbols s by ŝ which is the 4-vector of symbols that minimizes the sum of the error in the received signal on the receiver antenna:

$$\min \|r - A\hat{s}\|^2 = \min \|r - (A_1 \hat{s}_1 + A_2 \hat{s}_2)\|^2$$

Because there are a finite number of symbols in a constellation (e.g., QAM, QPSK, . . . ), there are only a finite number of symbol pairs to search for the minimization. And the minimization computations can use the channel estimates Â (derived from received known pilot symbol transmissions) in place of A. Further, the detector output may be a soft (log of symbol probability) output for each possible symbol; a MAP decoder would use such detector outputs.

The computations (search over the finite set of possible ŝ) can be recast by left multiplication with $A^H$ where $^H$ indicates Hermitian conjugate. This recasting provides a direct analysis below for the linear transformation W. Thus set:

$$z = A^H r = A^H (A s + w) = C s + A^H w$$

Then the decoding minimization formally becomes $$\min(z - C\hat{s})^H C^{-1}(z - C\hat{s})$$

where C is the 4×4 Hermitian matrix $A^H A$ which can be viewed as a 2×2 array of 2×2 matrices $A_k^H A_m$ for k,m=1, 2 with $$A_1^H A_1 = (|h_1|^2 + |h_2|^2) I_2 \quad (I_2 \text{ is } 2 \times 2 \text{ identity matrix})$$

$$A_2^H A_2 = (|h_3|^2 + |h_4|^2) I_2$$

$$A_1^H A_2 = \begin{bmatrix} (h_1^* h_3 + h_2 h_4^*) & -(h_1^* h_4 - h_2 h_3^*) \\ (h_1^* h_4 + h_2 h_4^*)^* & (h_1^* h_3 - h_2 h_4^*)^* \end{bmatrix}$$

$$A_2^H A_2 = (A_1^H A_2)^H$$

That is, C consists of STTD-encoded 2×2 subblocks and reflects the physical channel which determines performance of the communication system.

Now for W in general; choose W so that the corresponding transformed C, denoted C̃, will resemble the channel matrix of an independent, identically distributed channel in that: (1) expectations of off-diagonal elements are close to 0 and (2) expectations of on-diagonal elements are uniform. The off-diagonal elements reflect the average additional interference due to channel correlations, and the smallest on-diagonal element corresponds to the stream with the worst signal to interference plus noise ratio (SINR) which dominates performance. Thus transform with W to approximate optimal channel performance; so channel correlation underlies the choice of W as follows.

Presume a Rayleigh fading channel so the $h_m$ are normally distributed complex random variables with zero means. And the 4×4 channel covariance matrix, R, is the expectation of the 4×4 matrix of pairwise products of channel coefficients; that is, for k,m=1, 2, 3, 4:

$$R_{k,m} = E[h_k h_m^*]$$

For fading channels with rich scatterers (typical conditions for cellular wireless), the scattering at the transmitter and at the receiver are independent; and this independence, in general, implies R decomposes as the tensor product of the transmitter spatial covariance matrix $R_{TX}$ (elements $\rho_{TX}(k,m)$) and the receiver spatial covariance matrix $R_{RX}$ (elements $\rho_{RX}(i,j)$). That is, $R = R_{RX} \otimes R_{TX}$; or in other words, $E[h_{ik} h_{jm}^*] = \rho_{RX}(i,j) \rho_{TX}(k,m)$. For the preferred embodiments with 4 transmitter antennas and one receiver antenna:

$$E[h_k h_m^*] = \rho_{RX}(1,1) \rho_{TX}(k,m) \text{ for k,m=1, 2, 3, 4}$$

Thus $\rho_{RX}(1,1)$ is just a multiplicative constant, and the relative values of the $\rho_{TX}(k,m)$ determines the detection.

Estimate (e.g., maximum likelihood) the 4×4 transmitter covariance matrix, $R_{TX}$, by a sample covariance matrix which can be obtained from averaging the channel coefficient estimates $\hat{h}_m$ over multiple symbol intervals. Because $R_{TX}$ is Hermitian, there are only 4 diagonal plus 6 upper (or lower) triangular independent elements to estimate.

$$\rho_{RX}(1,1)\rho_{TX}(k,m)=(1/N)\Sigma_{1\leq n\leq N}\hat{h}_k[n]\hat{h}_m^*[n]$$

where N is the number of samples and the $\hat{h}_m[n]$ are the channel coefficient estimates for symbol interval n. The number of samples N used may depend upon the fading rate of the channel; but a heuristic rule of thumb takes N>5L where L is the length of vector $h_m$. The estimates $\hat{h}_m$ (from a pilot channel) are available from the space-time combining operation.

Now consider the effect of a linear transformation W. As illustrated in FIG. 2a the $y_m(n)$ are expressed in terms of the $x_m(n)$ by the linear transform W. Thus write $x_1(n)$, $x_2(n)$, $x_3(n)$, $x_4(n)$ as a 4-vector x(n) and similarly write $y_1(n)$, $y_2(n)$, $y_3(n)$, $y_4(n)$ as the 4-vector y(n), and take y(n)=W*x(n) where W is a 4×4 complex matrix and W* is the complex conjugate of W. Thus the received signal r(n) can be expressed in terms of the $x_m$ for general W by $$r(n) = h_1 y_1(n) + h_2 y_2(n) + h_3 y_3(n) + h_4 y_4(n) + w(n)$$
$$= \hbar_1 x_1(n) + \hbar_2 x_2(n) + \hbar_3 x_3(n) + \hbar_4 x_4(n) + w(n)$$

Take h to be the 4-vector with components $h_1$, $h_2$, $h_3$, $h_4$ and $\hbar$ the 4-vector components $\hbar_1$, $\hbar_2$, $\hbar_3$, $\hbar_4$, and thus $\hbar = W^H h$. In other words, the transformed physical channel in terms of x has channel coefficients $\hbar$:

$$r = \langle h | y \rangle + w$$
$$= \langle h | W^* x \rangle + w$$
$$= \langle W^H h | x \rangle + w$$
$$= \langle \hbar | x \rangle + w$$

Likewise in terms of x, the 2×2 STTD channel matrices are $A_1$ with first row $[\hbar_1, -\hbar_2]$ and second row $[\hbar_2^*, \hbar_1^*]$, and $A_2$ with first row $[\hbar_3, -\hbar_4]$ and second row $[\hbar_4^*, \hbar_3^*]$; the channel matrix $C=A^H A$; the transmitter covariance $R_{TX}=W^H R_{TX} W$, and the covariance $R=(I\otimes W)^H R (I\otimes W)$ where I is the 1×1 identity matrix from the receiver with one antenna. (If the receiver has one antenna with a Q-finger RAKE detector, then this is essentially the same as Q separate antennas and the receiver covariance matrix $R_{RX}$ is Q×Q and will reflect the RAKE combining; the following section considers multiple receiver antennas.)

The preferred embodiments choose W so the transformed channel matrix C approximates that of an independent, identically distributed channel. This translates into finding the W that minimizes the expectation of the off-diagonal terms of C and that uniformizes the expectations of the on-diagonal terms. First, presume a normalization: trace$\{W^H W\}=4$. Next, because only relative size among the $\hbar_m$ matters, normalize by taking trace$\{R_{TX}\}=4$; this implies $E[|\hbar_1|^2+|\hbar_2|^2+|\hbar_3|^2+|\hbar_4|^2]=4$. Then find W to minimize the sum of off-diagonal terms $\Sigma\Sigma_{k\neq m}$ trace$\{E[A_k^H A_m]\}$ and uniformize on-diagonal terms so $E[|\hbar_1|^2+|\hbar_2|^2]=E[|\hbar_3|^2+|\hbar_4|^2]=2$. FIG. 1b illustrates the foregoing flow, including intermittently updating the channel coefficient estimation and resultant W computation. And FIG. 2b shows a receiver block diagram.

More explicitly, a minimization of the off-diagonal elements together with uniformization of the on-diagonal elements of E[C] is taking W to $$\min\{|E[\hbar_1^*\hbar_3+\hbar_2\hbar_4^*]|^2+|E[\hbar_1^*\hbar_4-\hbar_2\hbar_3^*]|^2\}$$

$$\min\{|E[|\hbar_1|^2+|\hbar_2|^2]-2|\}$$

Thus the overall detection approach in FIG. 2b starts with estimates of the physical channel coefficients, $h_m$, as from pilot symbols, and these estimates (after linear transformation with the then-current W) are used to make A for detection. Of course, the W used for detection at the receiver must match the W used by the transmitter. And, for a W update, the recent channel estimates are used to generate estimates of the correlation expectations $E[h_k h_m^*]$ which are transformed by a W into the transformed channel correlation expectations $E[\hbar_k \hbar_m^*]$ and also, by combinations, into elements of an updated E[C]. Hence, update W by picking the transformation which makes E[C] approximate the maximum capacity channel with 0 off-diagonal elements and uniform on-diagonal elements. Intermittently (periodically) perform this update computation of W to adapt to changing channel conditions. The channel coefficients estimation could be a moving averages over a few slots (e.g., 3 slots, 6 slots, 15 slots with a 0.667 msec slot in WCDMA); or the estimation could be at the symbol rate by running the pilot through a simple smoothing filter, especially for high fading rates conditions. The W update may be once a transmission time interval which may be 1 slot, 3 slots, 5 slots, 15 slots. More adaptively, the updates could be according to an analysis of current channel estimates.

After finding W, which may be performed by both the transmitter and the receiver or just by the receiver and conveyed to the transmitter, the transmitter applies W to transmissions as illustrated in FIGS. 1a, 2a. Similarly, the receiver applies W to its estimates of physical channel coefficients $\hat{h}_m$ from pilot transmissions to recover the transformed physical channel coefficients $\hat{\hbar}_m$ and then the STTD matrices $A_m$ by expectations. The $A_m$ are used for space-time decoding as shown in FIGS. 1b, 2b by finding $\hat{s}$ to minimize $$\min(A^H r - C\hat{s})^H C^{-1} (A^H r - C\hat{s})$$

where. C is roughly the identity matrix. In this case, one may approximate the maximum likelihood matrix as $$\min \|A^H r - C\hat{s}\|^2$$

The minimization computations optimally consider all possible W and lead to complex computations. In the case of time-division duplexing (TDD) with base station transmission and reception (from mobiles) in the same (reciprocal) physical channel, the W computation may be performed at the base station using its channel estimates as in FIG. 1a; the base station typically has available computational power. The W used at the transmitter can be communicated to the receiver for detection. Alternatively, the receiver itself may also compute W based on its most recent or delayed channel estimates.

In contrast, for frequency-division duplexing (FDD) the W must be computed at the mobile receiver (the base station receives signals from the mobile in a different frequency band) and communicated to the base station via a feedback channel; consequently, quantization of W permits computations to be performed by searching (comparison-feedback) over smaller sets of possible Ws. A one-shot approach compares all possible choices of W and then progressively signals the quantized elements of W back to the transmitter, most significant bits first. Alternatively, partition the set of all possible W into subsets: $S_1, S_2, \ldots S_K$. Then at an update time t the receiver compares the choices of W in a corresponding subset $S_{k(t)}$, and the resulting best (minimizing) choice $W^{(k)}$ from this subset is then compared to the then-current previous best choices $W^{(1)}, \ldots, W^{(K)}$ from the other subsets, and the best $W^{(t)}$ of these $W^{(1)}, \ldots, W^{(k)}, \ldots, W^{(K)}$ is used as the update and sent to the transmitter.

Another low complexity approach restricts W to be a permutation of the $x_m$; that is, $y_1(n)=x_{\pi(1)}(n)$, $y_2(n)=x_{\pi(2)}(n)$, $y_3(n)=x_{\pi(3)}(n)$, $y_4(n)=x_{\pi(4)}(n)$ where $\pi$ is a permutation of $\{1,2,3,4\}$. Thus W will be a matrix with 4 elements equal to 1 and the remaining 12 elements equal to 0; and $\hbar_{\pi(m)}=h_m$. For an FDD system, the restriction to a search of only permutation Ws reduces the computation complexity for a mobile receiver which may have limited computational power. This is also particularly beneficial when the feedback resource is limited and/or the channel changes at a faster rate. By symmetry not all permutations must be considered; for example, interchanging $s_1$ and $s_2$ has no effect on the channel. Indeed, there are only 6 different permutations. Note that with W a permutation, the minimization constraint trace$\{W^H W\}=4$ automatically occurs, and the constraint $E[|\hbar_1|^2+|\hbar_2|^2]=E[|\hbar_3|^2+|\hbar_4|^2]=2$ translates to choosing from three possibilities (permutations): (1) $E[|h_1|^2+|h_2|^2] \cong E[|h_3|^2+|h_4|^2] \cong 2$; (2) $E[|h_1|^2+|h_3|^2] \cong E[|h_2|^2+|h_4|^2] \cong 2$; or (3) $E[|h_1|^2+|h_4|^2] \cong E[|h_2|^2+|h_3|^2] \cong 2$.

When the power across all the channel coefficients is uniformly distributed (that is, $E[|h_p|^2]=1$ for all p), the above constraints are automatically satisfied. In this case, it suffices to consider only the minimization of the off-diagonal terms of $E[\mathcal{C}]$. Otherwise, a tradeoff between the off-diagonal minimization and on-diagonal uniformization can be used. For example, the permutation matrix W may be chosen as the minimization:

$$\min\{v_1|E[h_{\pi(1)}^* h_{\pi(3)} + h_{\pi(2)} h_{\pi(4)}^*]|^2 + v_2|E[h_{\pi(1)}^* h_{\pi(4)} - h_{\pi(2)} h_{\pi(3)}^*]|^2 + v_3|E[|h_{\pi(1)}|^2 + |h_{\pi(2)}|^2] - 2|^2\}$$

where $v_1$, $v_2$, and $v_3$ are weighting parameters that are chosen to achieve the desired degree of trade-off.

Further, the approach of restricting W to be a permutation can be expanded to include weighting of the nonzero elements of W. In particular, with permutation $\pi$, take $y_1(n)=w_{\pi(1)}x_{\pi(1)}(n)$, $y_2(n)=w_{\pi(2)}x_{\pi(2)}(n)$, $y_3(n)=w_{\pi(3)}x_{\pi(3)}(n)$, $y_4(n)=w_{\pi(4)}x_{\pi(4)}(n)$ where the set of weights $\{w_1, w_2, w_3, w_4\}$ are nonzero and may be quantized to further limit complexity. In this case the constraint trace$\{W^H W\}=4$ translates into $|w_1|^2+|w_2|^2+|w_3|^2+|w_4|^2=4$.

3. Four Transmit Antennas with Multiple Receive Antennas Preferred Embodiments

Figure 1C:
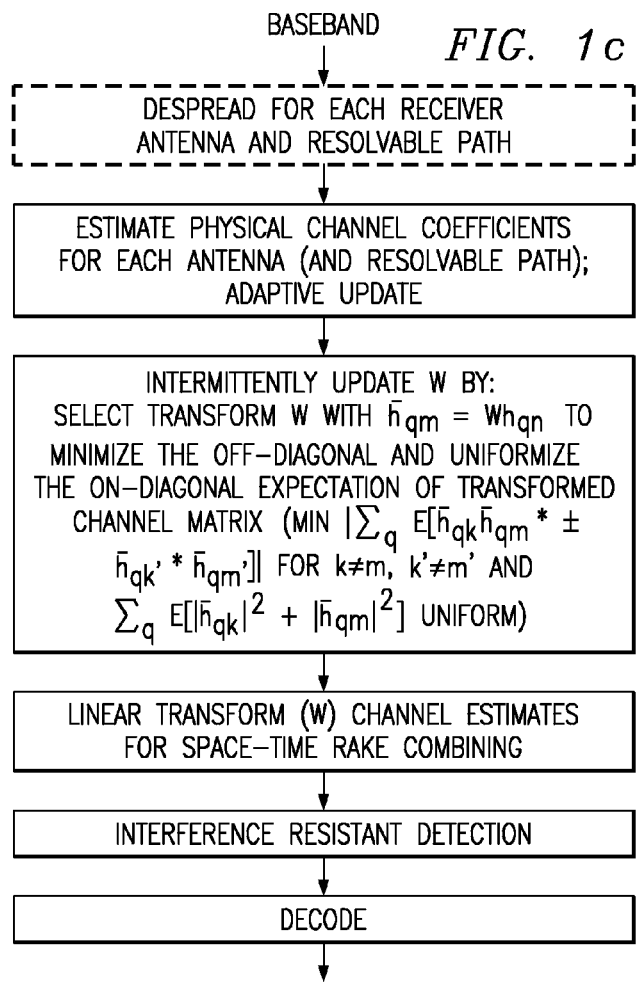
Figure 2D:
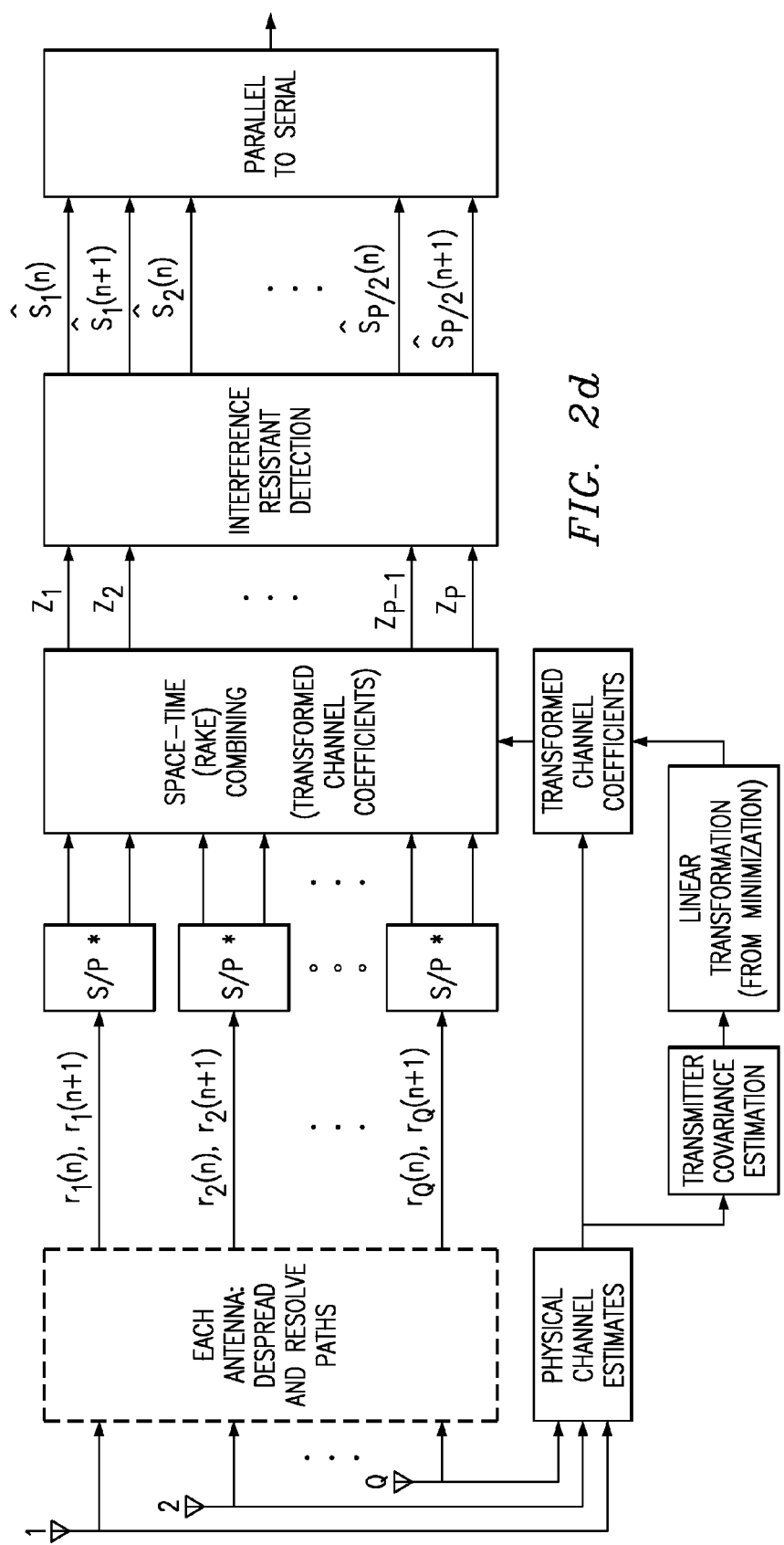
Figure 2E:
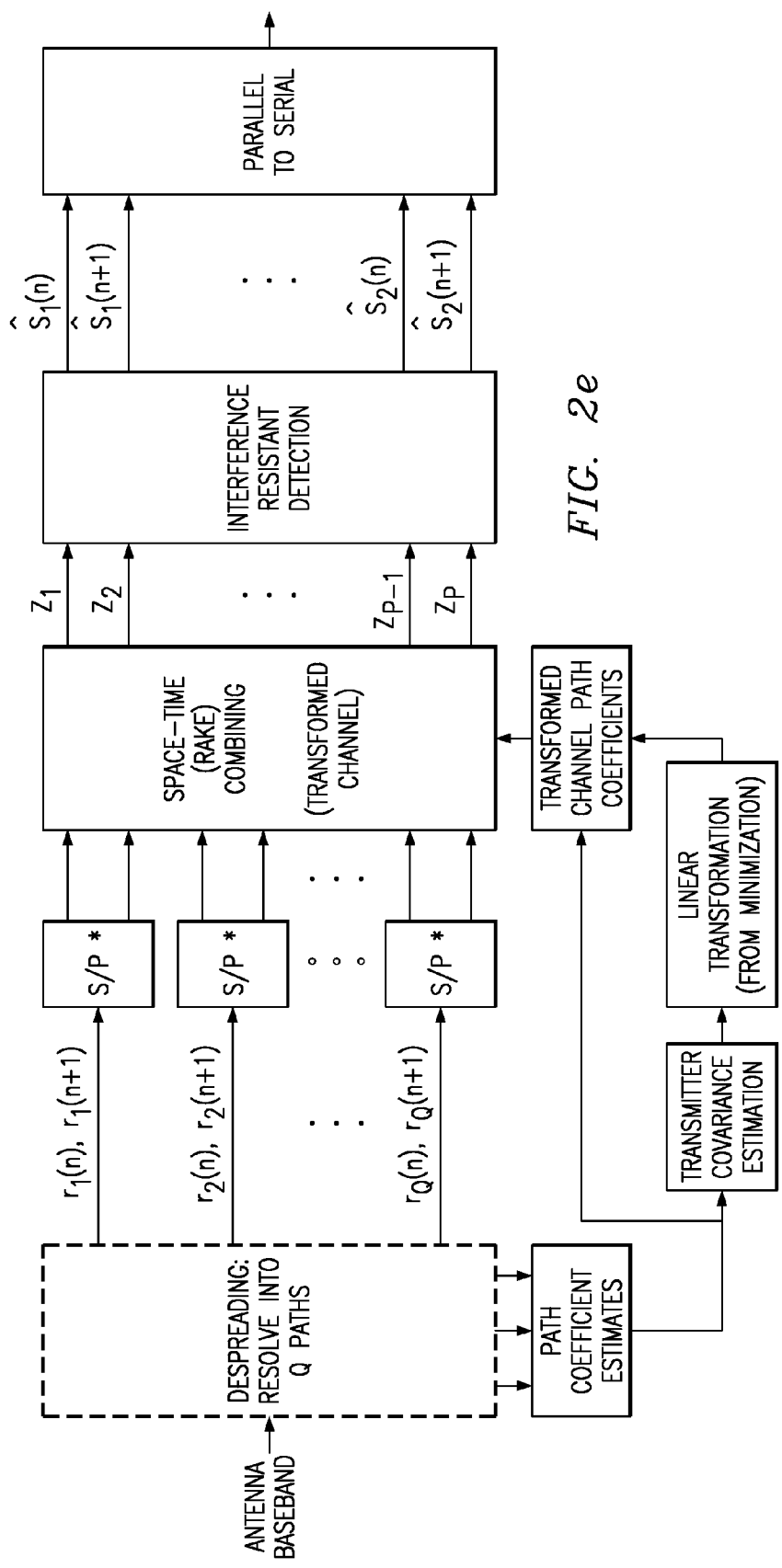

FIG. 2c illustrates a first preferred embodiment receiver with Q ($\geq 2$) antennas and which, analogous to the one antenna receiver of FIG. 2b, receives transmissions from the transmitter of FIG. 2a; FIG. 1c is a flow diagram. As FIG. 2e illustrates a single antenna together with Q RAKE fingers for tracking Q resolvable received paths can effectively operate the same as Q antennas because Q resolvable paths will have differing transmission channel coefficients. Similarly, other combinations of antennas and fingers can be interpreted as multiple antennas with single fingers or a single antenna with multiple fingers.

Denote the received despread baseband signal for symbol interval n for receiver antenna q ($1 \leq q \leq Q$) as $$r_q(n)=h_{q1}y_1(n)+h_{q2}y_2(n)+h_{q3}y_3(n)+h_{q4}y_4(n)+w_q(n)$$

where $h_{qm}$ is the baseband channel coefficient for the channel from the $m^{th}$ transmitter antenna to receiver antenna q and $w_q(n)$ is channel white noise. Pilot symbols from each of the four transmitter antennas provide updating estimates for the $h_{qm}$ as shown in FIG. 2d.

FIG. 1c is a flow diagram for the operation of the Q-antenna receiver which is analogous to and an extension of the operation of the previously-described one antenna receiver of FIG. 1b. In particular, using notation analogous to that of the foregoing, take $W^*$ as the 4×4 matrix that transforms x to y as before; then take $h_q$ to be the 4-vector with coefficients $h_{q1}$, $h_{q2}, h_{q3}, h_{q4}$, and set $\hbar_q=W^H h_q$, thus with a real inner product:

$$r_q = \langle h_q | y \rangle + w_q$$
$$= \langle h_q | W^* x \rangle + w_q$$
$$= \langle W^H h_q | x \rangle + w_q$$
$$= \langle \hbar_q | x \rangle + w_q$$

or more explicitly, $$r_q(n) = \hbar_{q1} x_1(n) + \hbar_{q2} x_2(n) + \hbar_{q3} x_3(n) + \hbar_{q4} x_4(n) + w_q(n)$$
$$= \hbar_{q1} s_1(n) + \hbar_{q2}(-s_1^*(n+1)) + \hbar_{q3} s_2(n) + \hbar_{q4}(-s_2^*(n+1)) + w_q(n)$$

and $$r_q^*(n+1) = \hbar_{q1}^* x_1^*(n+1) + \hbar_{q2}^* x_2^*(n+1) + \hbar_{q3}^* x_3^*(n+1) + \hbar_{q4}^* x_4^*(n+1) + w_q^*(n+1)$$
$$= \hbar_{q1}^* s_1^*(n+1) + \hbar_{q2}^* s_1(n) + \hbar_{q3}^* s_2^*(n+1) + \hbar_{q4}^* s_2(n) + w_q^*(n+1)$$

This can again be expressed in terms of 2-vectors and 2×2 matrices as:

$$r_q = \breve{A}_{q1} s_1 + \breve{A}_{q2} s_2 + w_q$$

where $r_q$ is the 2-vector of components $r_q(n)$, $r_q^*(n+1)$; $s_1$ is the 2-vector of components $s_1(n)$, $s_1^*(n+1)$; $s_2$ is the 2-vector of components $s_2(n)$, $s_2^*(n+1)$; $A_{q1}$ is a 2×2 matrix corresponding to the channels of the upper pair $x_1$, $x_2$ in FIG. 1a to receiver antenna q with first row of $A_{q1}$ equal $\hbar_{q1}$, $-\hbar_{q2}$ and second row $\hbar_{q2}^*$, $\hbar_{q1}^*$; $A_{q2}$ is a 2×2 matrix corresponding to the channels of the lower pair $x_3$, $x_4$ to receiver antenna q with first row $\hbar_{q3}$, $-\hbar_{q4}$ and second row $\hbar_{q4}^*$, $\hbar_{q3}^*$; and $W_q$ is a 2-vector with white noise components.

As with the prior preferred embodiment, the notation can be further compressed with the following definitions: the 2Q×1 vector r with its first two components equal the two components of $r_1$, next two components equal the two components of $r_2$, and so forth to the Qth last two components equal to the two components of $r_Q$ (i.e., vertical concatenation of $r_1, r_2, \ldots, r_Q$), 4×1 vector s as the vertical concatenation of $s_1$ and $s_2$; and 2Q×4 matrix $\mathbb{A}$ as the Q×2 array of 2×2 matrices $\mathbb{A}_{11}\ \mathbb{A}_{12}; \mathbb{A}_{21}\ \mathbb{A}_{22}; \ldots \mathbb{A}_{Q1}\ \mathbb{A}_{Q2}$ (thus the first row of $\mathbb{A}$ is $[\hbar_{11}, -h_{12}, h_{13}, -h_{14}]$ and second row $[h_{12}^*, h_{11}^*, h_{14}^*, h_{13}^*]$, third row $[h_{21}, -h_{22}, h_{23}, -h_{24}]$, fourth row $[h_{22}^*, h_{21}^*, h_{24}^*, h_{23}^*]$, and so forth down to the 2Qth row $[h_{Q2}^*, h_{Q1}^*, h_{Q4}^*, h_{Q3}^*]$. With this notation:

$$r = \check{\mathbb{A}}s + w$$

The matrix $\mathbb{A}$ is the 2Q×4 effective transformed channel coefficient matrix of the 4Q paths: one from each of the four $x_m$ to each of the Q receiver antennas. The 4×4 transformation matrix W will be determined as previously by approximating an independent, identically distributed channel.

As with the previous preferred embodiments, form $\mathbb{C}$ as the 4×4 Hermitian TI-32969AA Page 17 matrix $\mathbb{A}^H \mathbb{A}$ which can be viewed as a 2×2 array of sums of 2×2 matrices $\mathbb{A}_{q,k}^H \mathbb{A}_{q,m}$ with the sums over q in the range $1 \leq q \leq Q$ for each $k, m = 1, 2$, where $$\check{A}_{q1}^H \check{A}_{q1} = (|h_{q1}|^2 + |h_{q2}|^2) I_2 \ (I_2 \text{ is } 2 \times 2 \text{ identity matrix})$$

$$\check{A}_{q2}^H \check{A}_{q2} = (|h_{q3}|^2 + |h_{q4}|^2) I_2$$

$$\check{A}_{q1}^H \check{A}_{q2} = \begin{bmatrix} (h_{q1}^* h_{q3} + h_{q2} h_{q4}^*) & -(h_{q1}^* h_{q4} - h_{q2} h_{q3}^*) \\ (h_{q1}^* h_{q4} - h_{q2} h_{q3}^*)^* & (h_{q1}^* h_{q3} + h_{q2} h_{q4}^*) \end{bmatrix}$$

$$\mathbb{A}_{q2}^H \mathbb{A}_{q1} = (\mathbb{A}_{q1}^H \mathbb{A}_{q2})^H$$

That is, $\mathbb{C}$ consists of sums of STTD-encoded 2×2 subblocks and reflects the transformed physical channel which determines performance of the communication system. Again, the preferred embodiments choose the transformation W to enhance capacity of the physical channel C to yield the transformed physical channel $\mathbb{C}$.

As with the preceding preferred embodiments, the covariance matrix R decomposes as the tensor product of the transmitter spatial covariance matrix $R_{TX}$ (elements $\rho_{TX}(k,m)$) and the receiver spatial covariance matrix $R_{RX}$ (elements $\rho_{RX}(i,j)$). That is, $R = R_{RX} \otimes R_{TX}$; or for the preferred embodiments with 4 transmitter antennas and Q receiver antennas:

$E[h_{qp} h_{q'p'}^*] = \rho_{RX}(q,q')\ \rho_{TX}(p,p')$ for $p, p' = 1, \ldots, 4$; $q, q' = 1, \ldots, Q$ But then for each pair $q, q'$, all of the $\rho_{TX}(p,p')$ can be found up to the multiplicative constant $\rho_{RX}(q,q')$. That is, the separability of the receiver covariance and transmitter covariance implies the previously analyzed case Q=1 suffices. And the transformation W in general leads to the transformed transmitter covariance $\mathbb{R}_{TX} = W^H R_{TX} W$ and the transformed covariance $\mathbb{R} = (I_Q \otimes W)^H R (I_Q \otimes W)$ where $I_Q$ is the Q×Q identity matrix.

So repeat the previous: estimate the 4×4 transmitter covariance matrix, $R_{TX}$, by a sample covariance matrix which can be obtained from averaging the channel state estimates $\hat{h}_{qp}$ Lover multiple symbol intervals for one antenna q $$\rho_{RX}(q,q) \rho_{TX}(p,p') = (1/N) \Sigma_{1 \leq n \leq N} \hat{h}_{qp}[n] \hat{h}_{qp'}^*[n]$$

where N is the number of samples in the average. The estimates $\hat{h}$ (from a pilot channel) are available from the space-time RAKE operation. Further, the estimates of $\rho_{TX}(p,p')$ from various receiver antennas q can be averaged (with weightings) to improve the estimates.

Then find 4×4 W using any of the previous minimization approaches. The Q antennas implies the elements of 4×4 $E[\mathbb{C}]$ are sums over q. More explicitly, a minimization of the off-diagonal elements together with uniformization of the on-diagonal elements of $E[\mathbb{C}]$ to find W becomes:

$$\min\{|\Sigma_{1 \leq q \leq Q} E[\check{\hbar}_{q1}^* \check{\hbar}_{q3} + \check{\hbar}_{q2} \check{\hbar}_{q4}^*]|^2 +$$
$$|\Sigma_{1 \leq q \leq Q} E[\check{\hbar}_{q1}^* \check{\hbar}_{q4} - \check{\hbar}_{q2} \check{\hbar}_{q3}^*]|^2\}$$

$$\min\{|\Sigma_{1 \leq q \leq Q} E[|\check{\hbar}_{q1}|^2 + |\check{\hbar}_{q2}|^2] - 2|^2\}$$

with a normalization of $\Sigma_{1 \leq q \leq Q} E[|\check{\hbar}_{q1}|^2 + |\check{\hbar}_{q2}|^2 + |\check{\hbar}_{q3}|^2 + |\check{\hbar}_{q4}|^2] = 4$.

Analogous to the Q=1 scenario, an interference resistant detector must be used to separate the two independent data streams from two STTD encoders. In general, the optimal maximum likelihood detection would estimate the transmitted symbols s by $\hat{s}$ which is the vector of symbols that minimizes the sum of the errors in the received signal on the receiver antennas:

$$\|r_1 - (\mathbb{A}_{11}\hat{s}_1 + \mathbb{A}_{12}\hat{s}_2)\|^2 + \|r_2 - (\mathbb{A}_{21}\hat{s}_1 + \mathbb{A}_{22}\hat{s}_2)\| + \ldots + \|r_Q - (\mathbb{A}_{Q1}\hat{s}_1 + \mathbb{A}_{Q2}\hat{s}_2)\|^2$$

Such a maximum likelihood detection becomes computationally intensive with larger antenna systems. Since the size of matrix $\mathbb{A}$ is 2Q×4, linear (1-shot) and iterative detectors with lower complexity are applicable when Q is at least 2. As mentioned before, both linear and iterative detectors are based on the idea of interference suppression/cancellation. Possible methods include zero forcing and minimum mean square error (MMSE). In the following, the linear MMSE (LMMSE) and iterative MMSE (IMMSE) detectors are explained. A zero-forcing-based detector can be obtained from its MMSE analog by removing the second term in the matrix inverse.

Starting from the statistics z which is the output of the space-time RAKE combiner (e.g., FIG. 2d):

$$z = \check{\mathbb{A}}^H r = \check{\mathbb{A}}^H (\check{\mathbb{A}}s + w) = \check{\mathbb{C}}s + \check{\mathbb{A}}w$$

the LMMSE detector essentially performs a linear transformation F to the statistics z such that the mean square error (MSE) $E[\|Fz - s\|^2]$ is minimized. The (theoretically derived) linear transformation F is:

$$F = (\check{\mathbb{C}} + N_0/E_s I_4)^{-1}$$

where $N_0$ is the energy of each of the 2Q components of the white noise w, $E_s$ is the average energy of each symbol in s (assume that all the symbols in s are of the same constellation, modulation scheme), and $I_4$ is the 4×4 identity matrix. As noted above, the linear transformation for linear zero-forcing (LZF) detector is simply $$F = (\check{\mathbb{C}})^{-1}$$

And the resulting minimum MSE for all of the 4 symbols in s corresponds to the diagonal elements of the matrix $N_0 F$. The resulting linearly transformed statistics $y = Fz$ is essentially the soft estimate of s. Each element of y is then passed separately to a decision device (symbol detector) to provide the corresponding hard symbol estimate.

For systems with 4 transmit antennas, the iterative MMSE (IMMSE) detector is a sequence of 4 linear MMSE detection stages, where each detection provides the soft and hard symbol estimates for each of the 4 symbols in s. In each of the 4 stages, a linear MMSE transformation is performed. After the transformation, one symbol is selected for detection (based on the post detection SINR). The signal corresponding to that symbol is then regenerated and subtracted from the received signal. Let $a_1$, $a_2$, $a_3$, and $a_4$ denote the first, second, third, and fourth columns of matrix A. Also, let v(n) denote the n-th element of a vector v. The following pseudo-code describes how an IMMSE detector operates:

```
B = [ a₁ a₂ a₃ a₄ ]
for p=1 to 4
    F = ( Bᴴ B + N₀/E_s I)⁻     : (4–p+1) × (4–p+1) matrix
    y = F Bᴴ r                  : (4–p+1) ×1 vector
    Find the smallest diagonal element of matrix F
    Select one out of (4–p+1) symbols to be detected which
        corresponds to the smallest diagonal element of
        matrix F: let that be s(o(p) )
    Obtain soft estimate of symbol s(o(p) ) from the
        corresponding element of y
    Find the hard estimate of s(o(p) ): σ(o(p) )
    r = r – a_{o(p)} σ (o(p) )
    Remove column a_{o(p)} from B
end
```

Note that the symbol selection is based on the diagonal elements of matrix F, which correspond to symbol MSEs. Theoretically, the symbol MSE is inversely proportional to SINR.

4. Multiple Antenna Preferred Embodiments

FIG. 2c generalizes the foregoing transmitter from four transmit antennas to P antennas with P/2 separate STTD encoders for P/2 symbol streams $s_1, s_2, \ldots, s_{P/2}$. The preceding preferred embodiments are modified so that $$r_q(n) = h_{q1} y_1(n) + h_{q2} y_2(n) + \ldots + h_{qP} y_P(n) + w_q(n)$$
$$= \hbar_{q1} x_1(n) + \hbar_{q2} x_2(n) + \ldots + \hbar_{qP} x_P(n) + w_q(n)$$
$$= \hbar_{q1} s_1(n) + \hbar_{q2}(-s_1^*(n+1)) + \ldots + \hbar_{qP}(-s_{P/2}^*(n+1)) + w_q(n)$$

and similarly $$r_q^*(n+1) = \hbar_{q1}^* x_1^*(n+1) + \hbar_{q2}^* x_2^*(n+1) + \ldots + \hbar_{qP}^* x_P^*(n+1) + w_q^*(n+1)$$
$$= \hbar_{q1}^* s_1^*(n+1) + \hbar_{q2}^* s_1(n) + \ldots + \hbar_{qP}^* s_{P/2}(n) + w_q^*(n+1)$$

where W is a P×P linear transformation of P-vector x to P-vector y=W*x as in FIG. 2d and $\hbar_q = W^H h_q$.

This can again be expressed in terms of 2-vectors and 2×2 matrices as:

$$r_q = \check{A}_{q1} s_1 + \check{A}_{q2} s_2 + \ldots + \check{A}_{qP/2} s_{P/2} + W_q$$

where $r_q$ is the 2-vector of components $r_q(n)$, $r_q^*(n+1)$; $s_1$ is the 2-vector of components $s_1(n)$, $s_1^*(n+1)$; ..., $s_{P/2}$ is the 2-vector of components $s_{P/2}(n)$, $s_{P/2}^*(n+1)$; $A_{q1}$ is a 2×2 matrix corresponding to the channels of the upper pair $x_1$, $x_2$ in FIG. 2d to receiver antenna q with first row of $A_{q1}$ equal $\hbar_{q1}, -\hbar_{q2}$ and second row $\hbar_{q2}^*, \hbar_{q1}^*$; ..., and $A_{qP/2}$ is a 2×2 matrix corresponding to the channels of the bottom pair $x_{P-1}$, $x_P$ to antenna q with first row $\hbar_{q,P-1}, -\hbar_{qP}$ and second row $\hbar_{qP}^*, \hbar_{q,P-1}^*$.

As with the prior preferred embodiment, the notation can be further compressed with the following definitions: the 2Q×1 vector r with its first two components equal the two components of $r_1$, next two components equal the two components of $r_2$, and so forth to the Qth last two components equal to the two components of $r_Q$ (i.e., vertical concatenation of $r_1, r_2, \ldots, r_Q$), P×1 vector s as the vertical concatenation of $s_1, \ldots s_{P/2}$; and 2Q×P matrix A as the Q×P/2 array of 2×2 matrices $A_{11}$ $A_{12}$ ... $A_{1,P/2}$; $A_{21}$ $A_{22}$, ..., $A_{1,P/2}$; ... $A_{Q1}$ $A_{Q2}$, ..., AQ,P/2 (thus the first row of A is [$\hbar_{11}, -\hbar_{12}, \hbar_{13}, -\hbar_{14}, \ldots, \hbar_{1,P-1}, -\hbar_{1P}$] and second row [$\hbar_{12}^*, \hbar_{11}^*, \hbar_{14}^*, \hbar_{13}^*, \ldots, \hbar_{1P}^*, \hbar_{1,P-1}^*$], third row [$\hbar_{21}, -\hbar_{22}, \hbar_{23}, -\hbar_{24}, \ldots, \hbar_{2,P-1}, -\hbar_{2P}$], fourth row [$\hbar_{22}^*, \hbar_{21}^*, \hbar_{24}^*, \hbar_{23}^*, \ldots, \hbar_{2P}^*, \hbar_{2,P-1}^*$], and so forth down to the 2Qth row [$\hbar_{Q2}^*, \hbar_{Q1}^*, \hbar_{Q4}^*, \hbar_{Q3}^*, \ldots, \hbar_{QP}^*, \hbar_{Q,P-1}^*$]. With this notation:

$$r = \check{A}s + w$$

The matrix A is the 2Q×P effective transformed channel coefficient matrix of the PQ paths: one from each of the P transmitter antennas to each of the Q receiver antennas. The P×P transformation matrix W will be determined as previously by approximating an independent, identically distributed channel.

Form C as the P×P Hermitian matrix $A^H A$ and which is a P/2×P/2 array of sums of 2×2 STTD matrices $\check{A}_{q,k}^H \check{A}_{q,m}$ with the sums over q in the range $1 \leq q \leq Q$ for each k,m=1, 2, ... P/2 where:

$$\check{A}_{qm}^H \check{A}_{qm} = (|\hbar_{q,2m-1}|^2 + |\hbar_{q,2m}|^2) I_2 \quad (I_2 \text{ is } 2\times 2 \text{ identity matrix})$$

$$\check{A}_{qk}^H \check{A}_{qm} = \begin{bmatrix} (\hbar_{q,2k-1}^* \hbar_{q,2m-1} + \hbar_{q,2k} \hbar_{q,2m}^*) & -(\hbar_{q,2k-1}^* \hbar_{q,2m} - \hbar_{q,2k} \hbar_{q,2m-1}^*) \\ (\hbar_{q,2k-1}^* \hbar_{q,2m} - \hbar_{q,2k} \hbar_{q,2m-1}^*)^* & (\hbar_{q,2k-1}^* \hbar_{q,2m-1} + \hbar_{q,2k} \hbar_{q,2m}^*)^* \end{bmatrix}$$

$$\check{A}_{qm}^H \check{A}_{qk} = \left(\check{A}_{qk}^H \check{A}_{qm}\right)^H$$

That is, C consists of sums of STTD-encoded 2×2 subblocks and reflects the transformed physical channel and determines performance of the communication system. Again, the preferred embodiments choose the transformation W to enhance capacity of the physical channel C to yield the transformed physical channel C.

As with the preceding preferred embodiments, the covariance matrix R decomposes as the tensor product of the transmitter spatial covariance matrix $R_{TX}$ (elements $\rho_{TX}(k,m)$) and the receiver spatial covariance matrix $R_{RX}$ (elements $\rho_{RX}(i,j)$). That is, $R = R_{RX} \otimes R_{TX}$; or for the preferred embodiments with P transmitter antennas and Q receiver antennas:

$$E[h_{qp} h_{q'p'}^*] = \rho_{RX}(q,q') \rho_{TX}(p,p') \text{ for } p,p'=1, \ldots, P;$$
$$q,q'=1, \ldots, Q$$

Then for each pair q,q', all of the $\rho_{TX}(p,p')$ can be found up to the multiplicative constant $\rho_{RX}(q,q')$. That is, the separability of the receiver covariance and transmitter covariance means that the previously-analyzed case Q=1 suffices. Indeed, the transformation W in general leads to the transmitter covariance $R_{TX} = W^H R_{TX} W$ and the covariance $R = (I_Q \otimes W)^H R (I_Q \otimes W)$ where $I_Q$ is the Q×Q identity matrix.

So repeating the previous: estimate the P×P transmitter covariance matrix, $R_{TX}$, by a sample covariance matrix which can be obtained from averaging the channel state estimates $\hbar_{qp}$ over multiple symbol intervals for one antenna q $$\rho_{RX}(q,q) \rho_{TX}(p,p') = (1/N) \Sigma_{1 \leq n \leq N} \hbar_{qp}[n] \hbar_{qp'}^*[n]$$

where N is the number of samples in the average. The estimates ĥ (from a pilot channel) are available from the space-time RAKE operation.

Then find W using any of the previous minimization approaches. More explicitly, a minimization of the off-diagonal elements together with uniformization of the on-diagonal elements of E[C] implies picking W to achieve:

$$\min\left\{\left|\sum_{1\leq q\leq Q} E[\hbar_{q,2k-1}^* \hbar_{q,2m-1} + \hbar_{q,2k} \hbar_{q,2m}^*]\right| + \left|\sum_{1\leq q\leq Q} E[\hbar_{q,2k-1}^* \hbar_{q,2m} - \hbar_{q,2k} \hbar_{q,2m-1}^*]\right|\right\}$$

$$\min\left\{\left|\sum_{1\leq q\leq Q} E[|\hbar_{q,2k-1}|^2 + |\hbar_{q,2k}|^2] - 2\right|\right\}$$

with a normalization of $E[|\hbar_{q1}|^2 + |\hbar_{q2}|^2 + \ldots + |\hbar_{qP}|^2] = P$ and trace$\{W^H W\} = P$.

The same detection schemes (maximum likelihood, linear, and iterative) can be extended for an arbitrary value of P (even). When Q is at least P/2, linear and iterative detection can be applied.

5. Extension for Multipath (Frequency Selective) Channels

When the channel is frequency selective (contains multiple propagation paths with different delays), two possible scenarios can occur. The first scenario is relevant to CDMA systems with large spreading gain (e.g. ≧128) and the channel delay spread is small compared to one symbol duration. In this case, different paths arriving at the receiver at different delays can be resolved to provide multipath diversity without causing significant amount of inter-symbol interference. Additional path diversity can be treated as having additional receive antennas (e.g. having 2-path diversity at each antenna is equivalent to having 2Q receive antennas).

The second scenario is relevant to higher data rate systems where the channel delay spread is sufficiently large compared to one symbol duration that the effect of inter-symbol interference is significant. In this case, multipath interference suppression can be used in conjunction to the spatial interference resistant detector, especially when the number of users/codes is large and/or higher order modulation is used. The concept described above for selecting the best linear transformation W can be extended to this scenario.

6. MIMO Preferred Embodiment

Figure 2F:
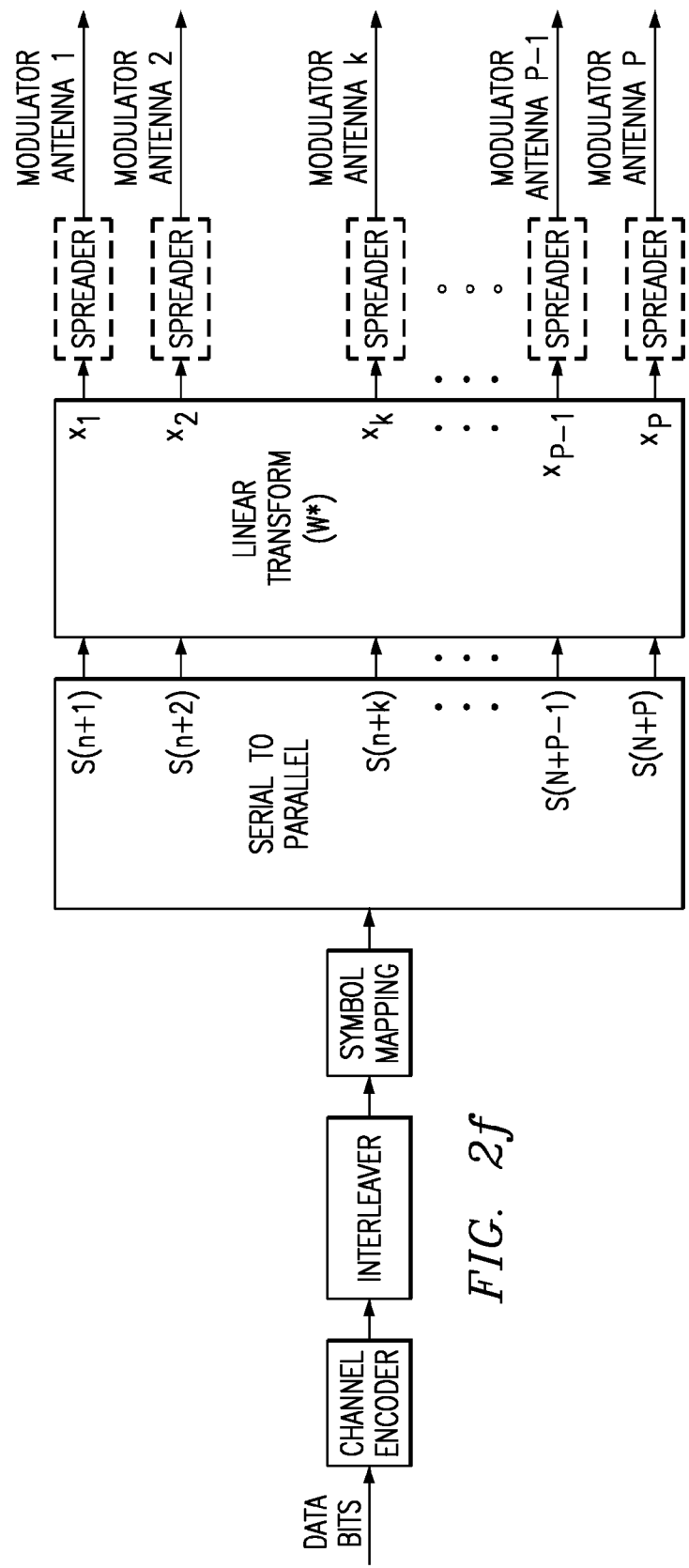
Figure 2G:
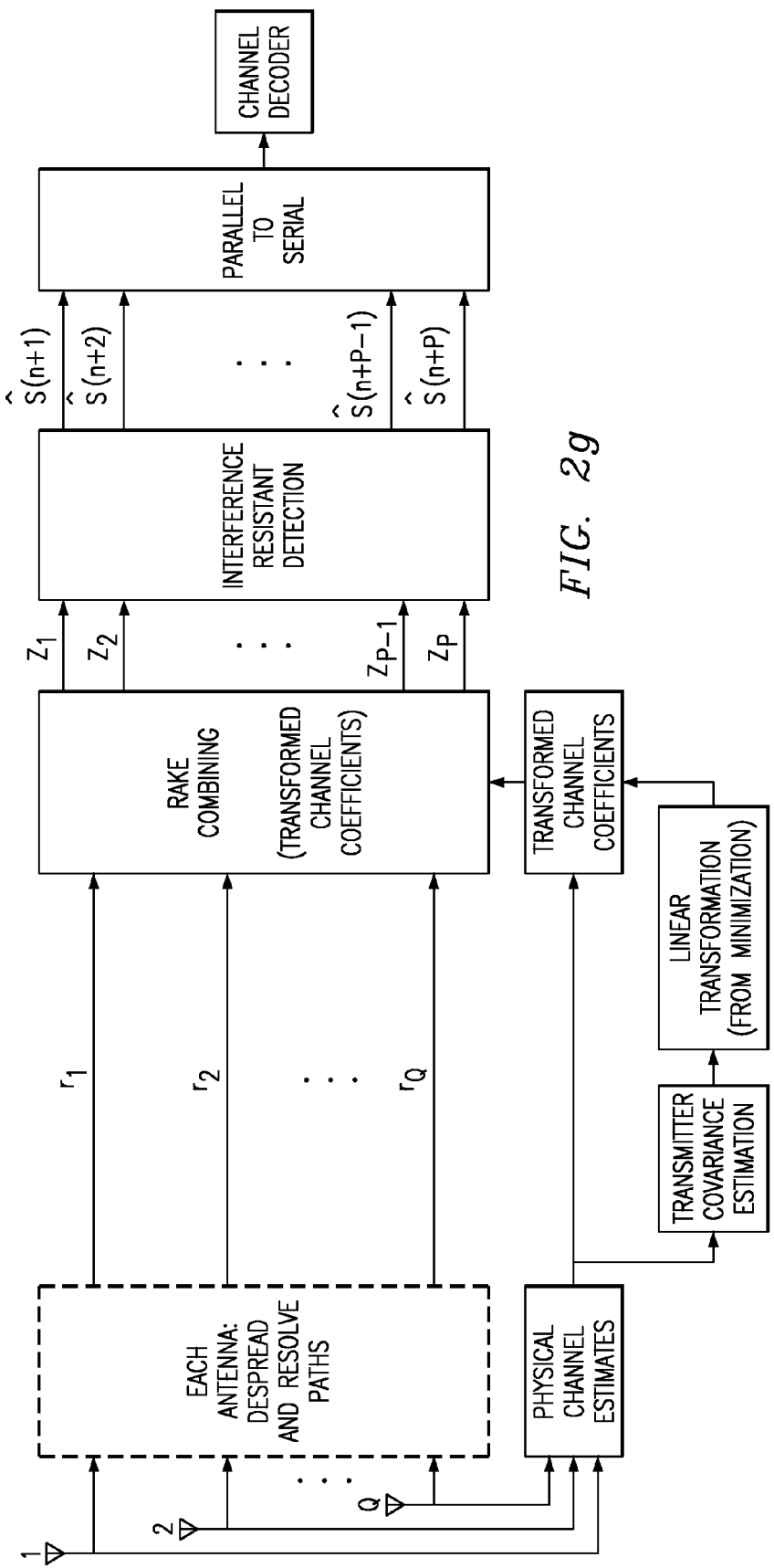

The above description applies to systems that employ multiple STTD encoding. The aforementioned weighting technique for combating the effect of correlated channels can also be applied to multi-input multi-output (MIMO) systems that do not employ any space-time coding. As illustrated in the transmitter and receiver of FIGS. 2f-2g, denote the number of transmit and receive antennas as P and Q, respectively. The received (despread) baseband signal across all receive antennas at any time interval can be written in a Q-dimensional vector as:

$$r = h_1 x_1 + h_2 x_2 + \ldots + h_P x_P + w$$
$$= [h_1 \; h_2 \; \ldots \; h_P][x_1 \; x_2 \; \ldots \; x_P]^T + w$$
$$= Hx + w$$

where $h_p$ denotes the Q-vector channel corresponding to the p-th transmit antenna, and $x_p$ is the transmitted signal via the p-th transmit antenna. The matrix H is the Q×P MIMO channel matrix and the vector x is the P×1 transmitted signal vector. Note that in this case, the time index (n) can be suppressed since the transmitted symbols are independent across time.

Analogous to the weighting in multiple STTD encoded systems, the P×1 transmitted signal vector x is obtained from the linearly transformed P×1 transmitted data symbol vector s. Denoting the P×P linear transformation as W, we have x=Ws. Hence, r can be written as $$r = H W s + w$$

Unlike in multiple STTD encoded systems, H contains the actual physical channel coefficients. That is, the (q,p)-th element of matrix H corresponds to the channel between the p-th transmit antenna and q-th receive antenna.

As with the preceding preferred embodiments, the covariance matrix R (where $R_{k,m} = E[h_k h_m^*]$) decomposes as the tensor product of the transmitter spatial covariance matrix $R_{TX}$ (elements $\rho_{TX}(k,m)$) and the receiver spatial covariance matrix $R_{RX}$ (elements $\rho_{RX}(i,j)$). That is, $R = R_{RX} \otimes R_{TX}$; or for the preferred embodiments with P transmitter antennas and Q receiver antennas:

$$E[h_{qp} h_{q'p'}^*] = \rho_{RX}(q,q') \rho_{TX}(p,p') \text{ for } p,p'=1,\ldots,P; \; q,q'=1,\ldots,Q$$

Then for each pair q,q', all of the $\rho_{TX}(p,p')$ can be found up to the multiplicative constant $\rho_{RX}(q,q')$. That is, the separability of the receiver covariance and transmitter covariance means that the previously-analyzed case Q=1 suffices.

Similar to that for multiple STTD, the P×P effective channel matrix after maximum ratio combining (denoted M) is $$M = W^H H^H H W$$

where the (i,j)-th element of matrix $H^H H$ is $h_i^H h_j = \Sigma_{1\leq q\leq Q} h_{iq}^* h_{qj}$. Hence, the elements of matrix $E[H^H H]$ can be directly related to the elements of matrix R since $\Sigma_{1\leq q\leq Q} E[h_{iq}^* h_{qj}] = \Sigma_{1\leq q\leq Q} \rho_{RX}(i,q) \rho_{TX}(q,j)$.

The rule for choosing W is similar to that for multiple STTD systems described above: choose W so that the corresponding transformed $E[H^H H]$, denoted E[M], will resemble the channel matrix of an independent, identically distributed channel in that: (1) expectations of off-diagonal elements are close to 0 and (2) expectations of on-diagonal elements are uniform. The off-diagonal elements reflect the average additional interference due to channel correlations, and the smallest on-diagonal element corresponds to the stream with the worst signal to interference plus noise ratio (SINR), which dominates performance.

W is found using any of the previous minimization approaches. More explicitly, let the (i,j)-th element of matrix E[M] be denoted as $M_{ij}$. Then, the minimization of the off-diagonal elements together with uniformization of the on-diagonal elements of E[M] implies picking W to achieve:

$$\min\{\Sigma_{1\leq i\leq P} \Sigma_{i\leq j\leq P} |M_{ij}|\}$$

$$\min\{\Sigma_{1\leq i\leq P} |M_{ij} - 1|\}$$

with a normalization of $\Sigma_{1\leq i\leq P} M_{11} = P$ and trace$\{W^H W\} = P$.

The same detection schemes (maximum likelihood, linear, and iterative) can be extended for an arbitrary value of P. When Q is at least P, linear and iterative detection can be applied.

The minimization computations optimally consider all possible W and lead to complex computations. In the case of time-division duplexing (TDD) with base station transmission and reception (from mobiles) in the same (reciprocal) physical channel, the W computation may be performed at the base station using its channel estimates as in FIG. 1a; the base station typically has available computational power. The W used at the transmitter can be communicated to the receiver for detection. Alternatively, the receiver itself may also compute W based on its most recent or delayed channel estimates.

In contrast, for frequency-division duplexing (FDD) the W must be computed at the mobile receiver (the base station receives signals from the mobile in a different frequency band) and communicated to the base station via a feedback channel; consequently, quantization of W permits computations to be performed by searching (comparison-feedback) over smaller sets of possible Ws. A one-shot approach compares all possible choices of W and then progressively signals the quantized elements of W back to the transmitter, most significant bits first. Alternatively, partition the set of all possible W into subsets: $S_1, S_2, \ldots S_K$. Then at an update time t the receiver compares the choices of W in a corresponding subset $S_{k(t)}$, and the resulting best (minimizing) choice $W^{(k)}$ from this subset is then compared to the then-current previous best choices $W^{(1)}, \ldots, W^{(K)}$ from the other subsets, and the best $W^{(t)}$ of these $W^{(1)}, \ldots, W^{(k)}, \ldots W^{(K)}$ is used as the update and sent to the transmitter.

Unlike for multiple STTD encoded systems, it can be shown that choosing W to be a permutation matrix does not change the resulting channel statistics, hence does not provide any performance advantage over a non-transformed system. For MIMO systems, W can be chosen as a unitary (complex rotation) matrix. For instance P=2, the rotation matrix is $$\begin{bmatrix} \cos(\theta)e^{j\varphi} & -\sin(\theta)e^{j\varphi} \\ \sin(\theta) & \cos(\theta) \end{bmatrix} \quad 0 \le \theta < \pi/2, \; 0 \le \varphi < 2\pi$$

For FDD systems, the angles θ and φ can be uniformly quantized to finite number of values. For systems with P>2, Givens or Householder rotations can be used.

7. Asymmetric Modulation Preferred Embodiments

Figure 1D:
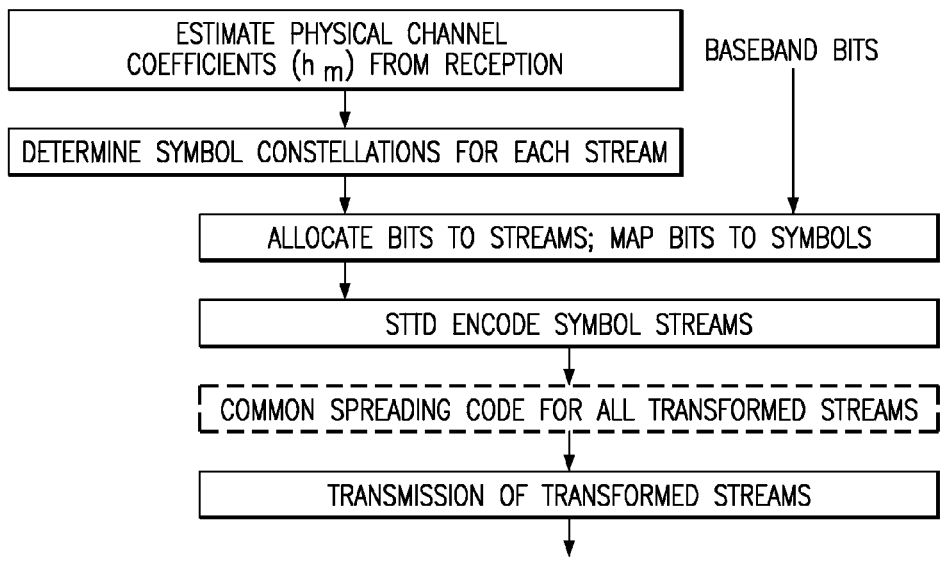
Figure 3:
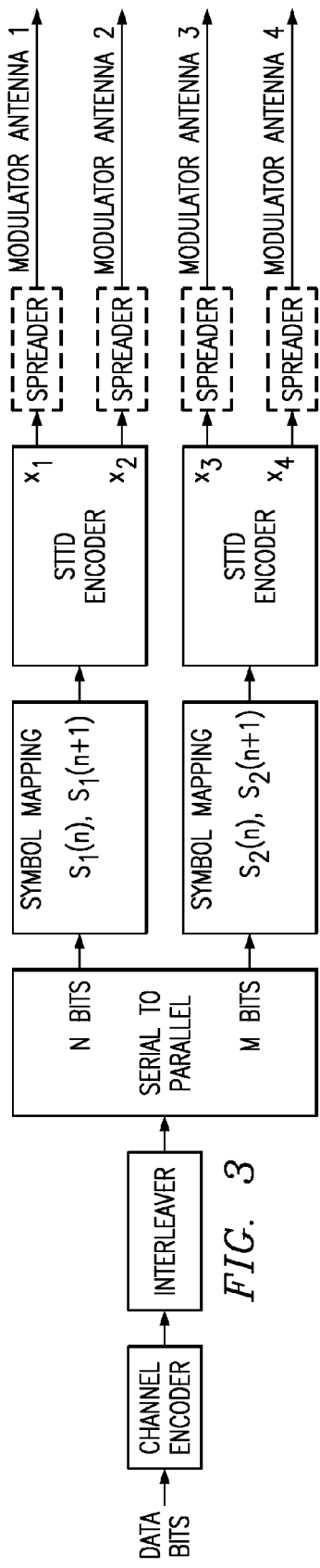
FIGS. 3-4 show other preferred embodiment transmitter and receiver.

FIG. 3 illustrates asymmetric modulation preferred embodiments for two symbol streams (analogous to FIG. 2a) in which the symbol mapping differs for the streams; FIG. 1d is a flow diagram. In particular, in a first asymmetric preferred embodiment the serial-to-parallel converter processes 6 bits per symbol interval by alternating sets of 2 bits to the upper symbol mapper and 4 bits to the lower symbol mapper. The upper symbol mapper maps a set of 2 bits into a QPSK symbol, and the lower mapper maps a set of 4 bits into a 16-QAM symbol. The resulting symbol streams (upper QPSK and lower 16-QAM) are each STTD encoded (and spread) and transmitted. In a variation, the serial-to-parallel converter could process groups of 12 bits (2 symbol intervals) by 4 bits to the upper mapper for two QPSK symbols followed by 8 bits to the lower mapper for two 16-QAM symbols. This asymmetric symbol constellation sizes can take advantage of asymmetries in the channel (space diversity). The symbol mapping may be adaptive to the channel by using channel estimates to compare capacity of the transmitter antennas. The symbol mappers may provide multiple symbol constellations for dynamic adaptation; or all the symbol mappings may be performed in a single (programmable) DSP or other processor.

Figure 4:
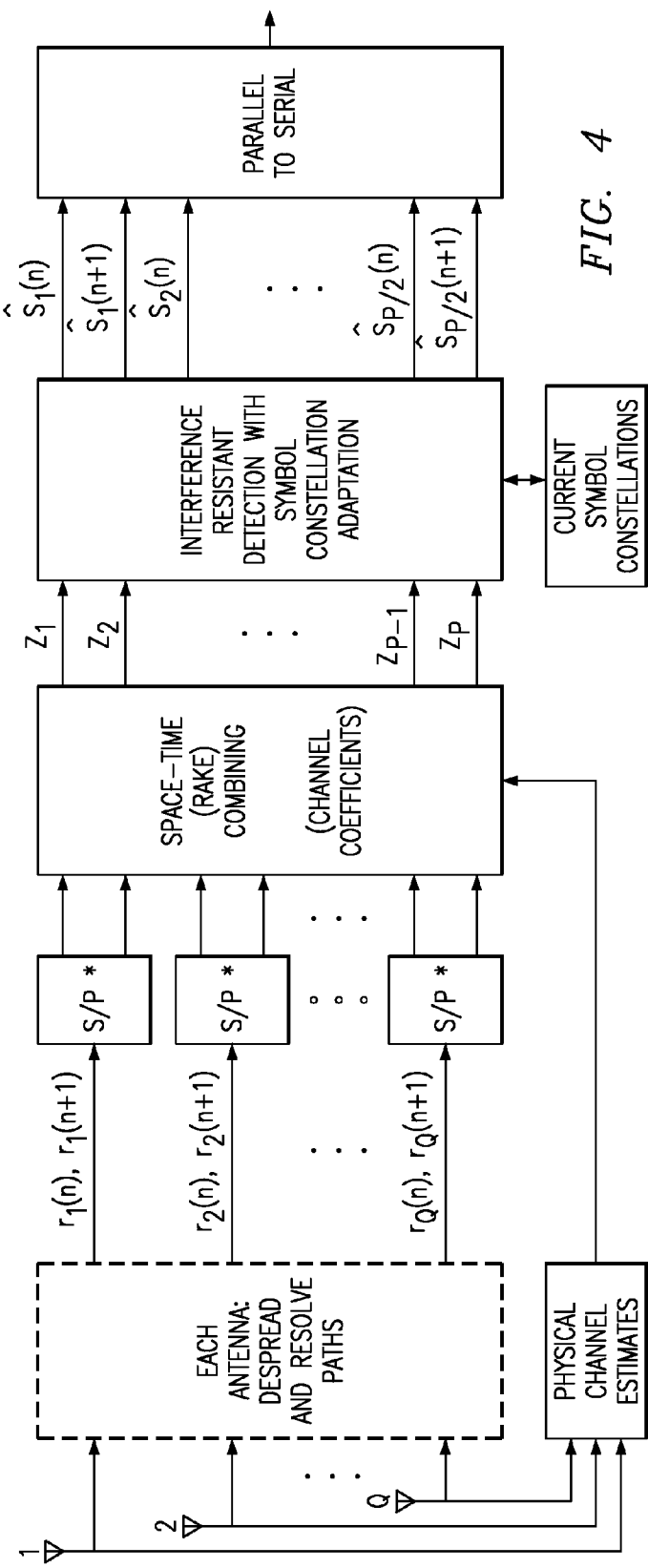

FIG. 4 shows a receiver for the asymmetric symbol transmission where detection uses the appropriate symbol constellations which are updated intermittently (periodically).

Analogously, the asymmetric symbol preferred embodiments can also use time diversity in that the symbol mapping may alternate in successive symbol periods. And time diversity can be mixed with space diversity. In particular, for 12 bits per 2 symbol intervals the following symbol possibilities arise:

| asymmetry | $s_1(n)$ | $s_1(n+1)$ | $s_2(n)$ | $s_2(n+1)$ |
|---|---|---|---|---|
| none | 8PSK | 8PSK | 8PSK | 8PSK |
| space | QPSK | QPSK | 16-QAM | 16-QAM |
| time | QPSK | 16-QAM | QPSK | 16-QAM |
| space/time | QPSK | 16-QAM | 16-QAM | QPSK |

For other numbers of bits per symbol interval, other symbol constellations would be used; for example, 18 bits per 2 symbol intervals could use 16-QAM plus 32-QAM. And the bit rate (bits per symbol interval) could vary in time, so the pairs of constellations used would also vary.

More generally, different combinations of 4 modulation (symbol mapping) schemes can be used, one for each transmit antenna. For multiple STTD systems with P transmit antennas, different combinations of P modulation schemes can be used. A combination of P modulation schemes corresponds to a particular assignment of P modulation schemes to P different symbols.

Given a predetermined set of different modulation assignments, there are a number of possible criteria for selecting the desired modulation assignment from the set. These criteria can be categorized into two groups: fixed and adaptive. A fixed criterion does not depend on the channel dynamics, whereas an adaptive criterion periodically updates the modulation assignment based upon the change in channel condition.

An example of fixed criteria for systems with 4 transmit antennas is to select an asymmetric assignment of QPSK for one stream and 16-QAM for the second stream as described above. This selection results in better performance compared to the symmetric assignment of 8-PSK for both streams. It can be argued that the aforementioned asymmetric assignment results in approximately 1-dB improvement over the symmetric assignment regardless of the channel condition.

Adaptive criterion can be based on several metrics. One possible metric is to minimize the bit error rate (BER) or the frame error rate (FER) for a given channel realization while fixing the data rate. In this case, the set of possible modulation assignments contains different assignments, which result in the same data rate. Another possible metric is to maximize the system throughput (data rate) for a given channel realization while imposing a worst-case error rate (BER or FER) constraint. In this case, the set of modulation assignments contains different assignments with varying data rates. In both cases, a relation/mapping between the channel parameters and the error rate (BER or FER) is needed. Such mapping depends on the type of detector that is used at the receiver. For the maximum likelihood detector, a union bound for BER in terms of the channel parameters and modulation assignment scheme can be derived. The selected assignment for the first case should be the one that results in the minimum BER bound. For linear and iterative (zero forcing or minimum mean square error (MMSE)) detectors, the error rate is a decreasing function of minimum/worst-case post-detection SINR, where the minimum is taken across all the P symbols. Hence, the selected assignment for the first case should be the one that results in the largest minimum/worst-case post-detection SINR. Closed-form expressions of the post-detection SINR for each symbol can be derived for different types of linear and iterative detectors.

Before considering the mapping between post-detection SINR and channel parameters, it is essential to discuss the operations of linear and iterative detectors. Focus on MMSE-based detectors since a zero-forcing-based detector can be obtained from its MMSE analog by removing the second term in the matrix inverse.

Repeating previously-used notation and a FIG. 3 transmitter, take the received signals on antenna q after down conversion (and any dispreading) as:

$$r_q(n) = h_{q1}x_1(n) + h_{q2}x_2(n) + \ldots + h_{qP}x_P(n) + w_q(n)$$
$$= h_{q1}s_1(n) + h_{q2}(-s_1^*(n+1)) + \ldots + h_{qP}(-s_{P/2}^*(n+1)) + w_q(n)$$

and similarly $$r_q^*(n+1) = h_{q1}^*x_1^*(n+1) + h_{q2}^*x_2^*(n+1) + \ldots + h_{qP}^*x_P^*(n+1) + w_q^*(n+1)$$
$$= h_{q1}^*s_1^*(n+1) + h_{q2}^*s_1(n) + \ldots + h_{qP}^*s_{P/2}(n) + w_q^*(n+1)$$

where $h_{qp}$ is the physical channel coefficient from transmit antenna p to receive antenna q.

This can again be expressed in terms of 2-vectors and 2×2 matrices as:

$$r_q = A_{q1}s_1 + A_{q2}s_2 + \ldots + A_{qP/2}s_{P/2} + w_q$$

where $r_q$ is the 2-vector of components $r_q(n)$, $r_q^*(n+1)$; $S_1$ is the 2-vector of components $s_1(n)$, $s_1^*(n+1)$; . . . , $s_{P/2}$ is the 2-vector of components $s_{P/2}(n)$, $s_{P/2}^*(n+1)$; $A_{q1}$ is a 2×2 matrix corresponding to the channels of the upper pair $x_1$, $x_2$ in FIG. 3 to receiver antenna q with first row of $A_{q1}$ equal [$h_{q1}$, $-h_{q2}$] and second row [$h_{q2}^*$, $h_{q1}^*$]; . . . , and $A_{qP/2}$ is a 2×2 matrix corresponding to the channels of the bottom pair $x_{P-1}$, $x_P$ (P=4 in FIG. 3) to antenna q with first row [$h_{q,P-1}$, $-h_{qP}$] and second row [$h_{qP}^*$, $h_{q,P-1}^*$].

As with the prior preferred embodiment, the notation can be further compressed with the following definitions: the 2Q×1 vector r with its first two components equal the two components of $r_1$, next two components equal the two components of $r_2$, and so forth to the Qth last two components equal to the two components of $r_Q$ (i.e., vertical concatenation of $r_1, r_2, \ldots, r_Q$), P×1 vector s as the vertical concatenation of $s_1 \ldots s_{P/2}$; and 2Q×P matrix A as the Q×P/2 array of 2×2 matrices $A_{11}$ $A_{12}$ . . . $A_{1,P/2}$; $A_{21}$ $A_{22}$, . . . , $A_{1,P/2}$ . . . ; $A_{Q1}$, $A_{Q2}$, . . . , $A_{Q,P/2}$ (thus the first row of A is [$h_{11}$, $-h_{12}$, $h_{13}$, $-h_{14}$, . . . , $h_{1,P-1}$, $-h_{1P}$] and second row [$h_{12}^*$, $h_{11}^*$, $h_{14}^*$, $h_{13}^*$, . . . , $h_{1P}^*$, $h_{1,P-1}^*$], third row [$h_{21}$, $-h_{22}$, $h_{23}$, $-h_{24}$, . . . , $h_{2,P-1}$, $-h_{2P}$], fourth row [$h_{22}^*$, $h_{21}^*$, $h_{24}^*$, $h_{23}^*$, . . . , $h_{2P}^*$, $h_{2,P-1}^*$], and so forth down to the 2Qth row [$h_{Q2}^*$, $h_{Q1}^*$, $h_{Q4}^*$, $h_{Q3}^*$, . . . , $h_{QP}^*$, $h_{Q,P-1}^*$]. With this notation:

$$r = A\,s + w$$

The matrix A is the 2Q×P effective transformed channel coefficient matrix of the PQ paths: one from each of the P transmitter antennas to each of the Q receiver antennas.

With P=4 and starting from the statistics z which is the output of the space-time RAKE combiner:

$$z = A^H r = A^H(A\,s + w) = C\,s + A^H w$$

the LMMSE detector essentially performs a linear transformation F to the statistics z such that the mean square error (MSE) $E[\|F\,z - s\|^2]$ is minimized. Again, theoretically, such linear transformation F is:

$$F = (C + N_0 E^{-1})^{-1}$$

where $N_0$ is the energy of each of the 2Q components of the white noise w, E is the 4×4 diagonal matrix of symbol average energies: $E_{11}$ is average energy of $s_1(n)$, $E_{22}$ average of $s_1(n+1)$, $E_{33}$ average of $s_2(n)$, $E_{44}$ average of $s_2(n+1)$ (e.g., n denotes even-indexed symbol intervals and n+1 denotes odd-indexed intervals). As noted above, the linear transformation for linear zero-forcing (LZF) detector is simply $F = C^{-1}$.

The resulting minimum MSE for all the 4 symbols in s corresponds to the diagonal elements of the matrix $N_0$ F. The resulting linearly transformed statistics y=Fz is essentially the soft estimate of s. Each element of y is then passed separately to a decision device (symbol detector) provide the corresponding hard symbol estimate.

For systems with 4 transmit antennas, the iterative MMSE (IMMSE) detector is a sequence of 4 linear MMSE detection stages, where each detection provides the soft and hard symbol estimates for each of the 4 symbols in s. In each of the 4 stages, a linear MMSE transformation is performed. After the transformation, one symbol is selected for detection. The signal corresponding to that symbol is then regenerated and subtracted from the received signal.

Let $a_1$, $a_2$, $a_3$, and $a_4$ denote the first, second, third, and fourth columns of matrix A. Also, let v(n) denote the n-th element of a vector v. The following pseudo-code describes how IMMSE detector operates:

```
B = [ a₁ a₂ a₃ a₄ ]
E = diag{ E₁₁ , E₂₂ , E₃₃ , E₄₄ }
for p=1 to 4
    F = ( Bᴴ B + N₀ E⁻¹ )⁻¹      : (4−p+1) × (4−p+1) matrix
    y = F Bᴴ r                    : (4−p+1) ×1 vector
    Find the smallest diagonal element of matrix F
    Select one out of (4−p+1) symbols to be detected which
        corresponds to largest SINR: let that be s(o(p) )
    Obtain soft estimate of symbol s(o(p) ) from the
        corresponding element of y
    Find the hard estimate of s(o(p) ): σ(o(p) )
    r = r − a_{o(p)} σ (o(p) )
    Remove column a_{o(p)} from B
    Remove column o(p) and row o(p) from matrix E
end
```

The extension for systems with P=2p (p≧3) transmit antennas is straightforward.

For MMSE-based detectors the post-detection symbol SINR corresponding to the n-th element of s is $$SINR(n) = (E_{nn}/N_0)F_{nn} - 1$$

where $F_{nn}$ indicates the n-th diagonal element of matrix F. For LMMSE, matrix F is the same for all the symbols in s (see the above discussion on LMMSE). For IMMSE, matrix F is different for different symbols in s since each symbol is detected at different iteration. This SINR expression can be used for selecting the symbol to be detected at each iteration. Based on the above relation, the selected symbol is the one that results in the minimum ($F_{nn}/E_{nn}$). Symbol selection at each iteration can also be thought of as finding the detection order.

The SINR expression given above is instrumental for selecting the modulation assignment (described above) as it provides an explicit relation between the post-detection SINR (which is inversely related to BER or FER) and the channel condition (conveyed in matrix F) for both linear and iterative MMSE detectors. For a fixed data rate constraint, the adaptive assignment selection chooses a modulation assignment that maximizes the worst-case SINR (minimum SINR across all the symbols in s). For a fixed error rate constraint, the system throughput is maximized by selecting an assignment with the highest possible data rate that still satisfies the error rate constraint. In this case, the mapping between SINR and error rate can be used.

Related to the detection ordering (symbol selection at each iteration) for an IMMSE detector, preferred embodiments also provide a better metric than ($F_{nn}/E_{nn}$). The asymmetry of the symbol constellations implies differing average energy for differing symbol streams. Instead of using the post-detection symbol SINR, use the MSE scaled by the average symbol energy (which is: $E_{nn} F_{nn}$), which reflects per bit MSE. This metric works better when bit error rate is of interest rather than symbol error rate. The same holds for iterative zero-forcing detector where the mean square error is equivalent to the noise variance: using $E_{nn} F_{nn}$ for detection ordering results in better performance ($F=(B^H B)^{-1}$ for iterative zero-forcing).

The symbol mapping asymmetry also extends to the case of more than 2 streams with STTD encoding; that is, the transmitter of FIG. 2c can have an asymmetric symbol mapping among the P/2 streams.

The asymmetric modulation preferred embodiments can also follow the setup of FIG. 2a in that the symbol mapping may be performed prior to the serial-to-parallel. Further, the STTD encoder outputs of the asymmetric symbols can also be linearly transformed prior to transmission; thereby combining the asymmetry with the channel adaptation of preceding preferred embodiments. In fact, a permutation linear transformation together with fixed symbol mappers can provide the choice among space-only, time-only, and space-time asymmetries. The receiver with Q antennas may be as in FIG. 2d with the detection including searches over asymmetric constellation products.

Analogous to the linear transformation preferred embodiments, for a TDD system both the transmitter and the receiver can compute channel conditions and thus the constellation selection, but either the transmitter or the receiver alone could perform the computations and convey to the other the constellation selection. In an FDD system the receiver assesses the channel conditions and conveys information to the transmitter; and the transmitter could perform the selection computation and convey such to the receiver.

8. Simulation Results

Figure 5:
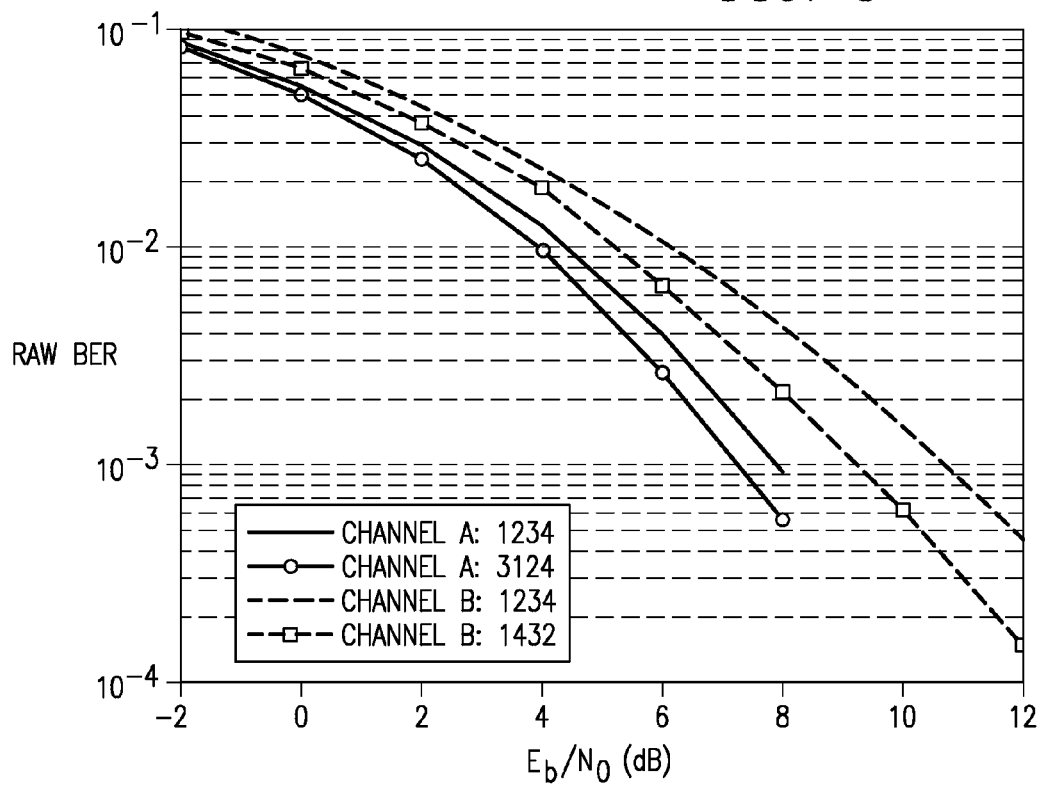
Figure 6:
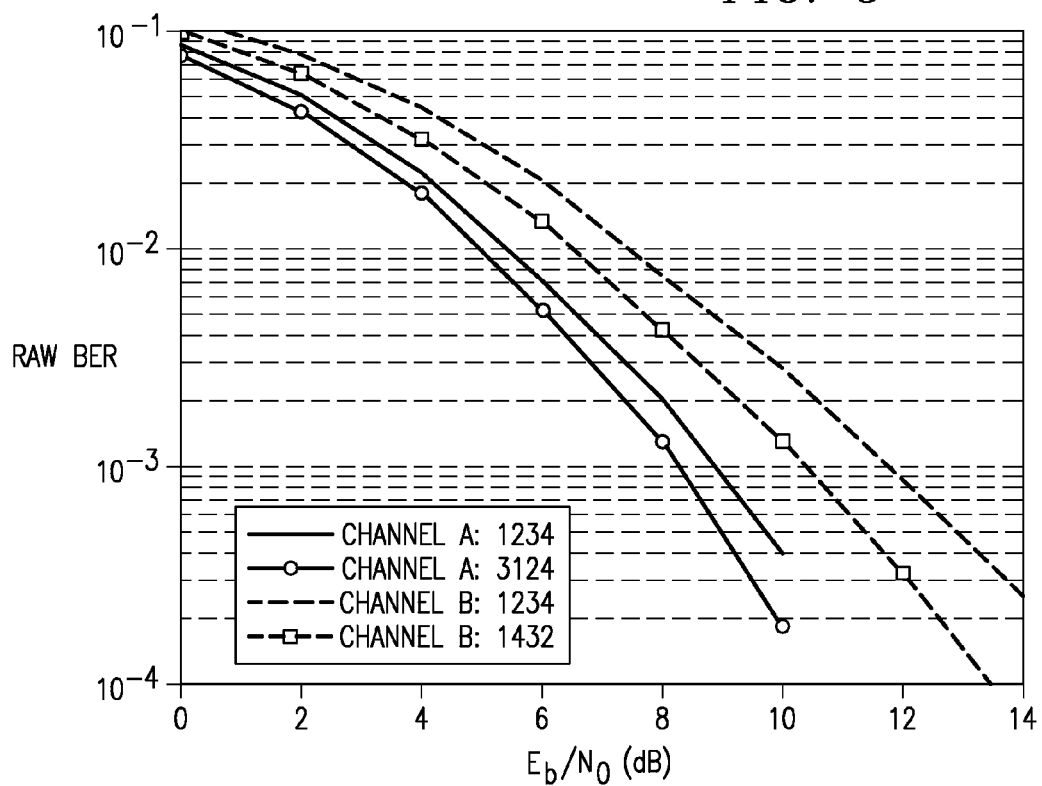
Figure 7:
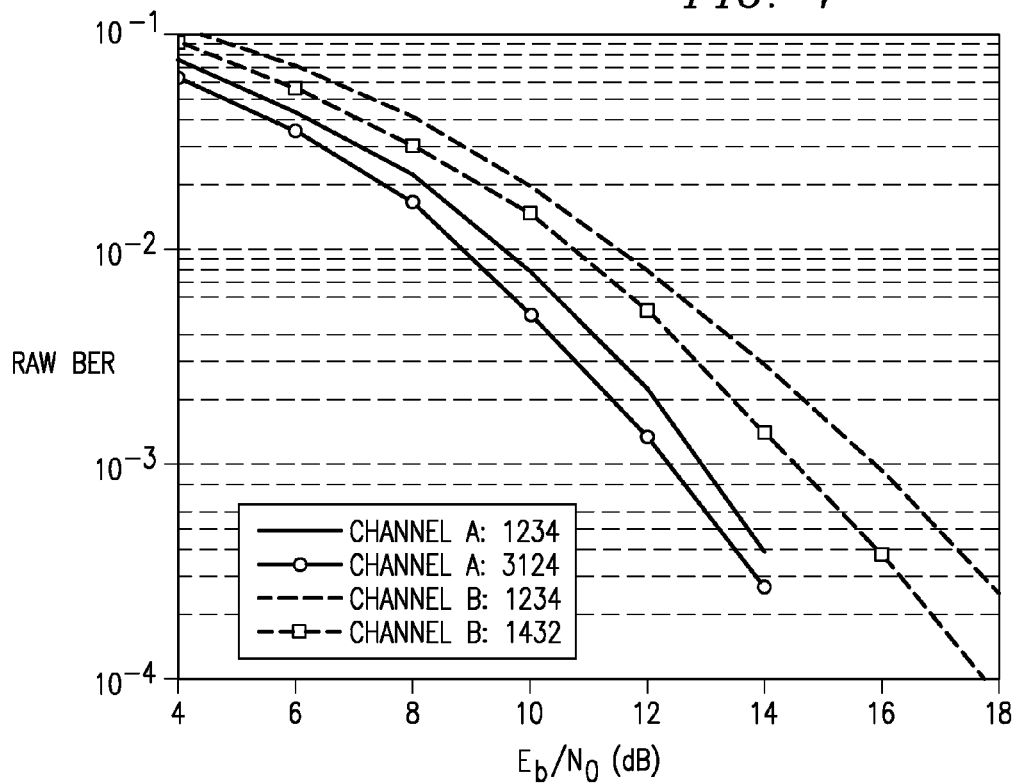

FIGS. 5-7 show simulation results of with and without optimal permutation W for double STTD with P=4 transmit antennas and Q=4 receiver antennas for 8-PSK, 16-QAM, and 64-QAM, respectively. In particular, channels A and B are flat Rayleigh fading models (peak cross-correlation of 0.6 for channel B). Here, 1234 denotes regular double STTD without permutation; 3124 is the optimal permutation for channel A; and 1432 is the optimal permutation for channel B. The optimal permutation does not depend upon the modulation scheme, it only depends upon the spatial covariance profile.

Figure 8:
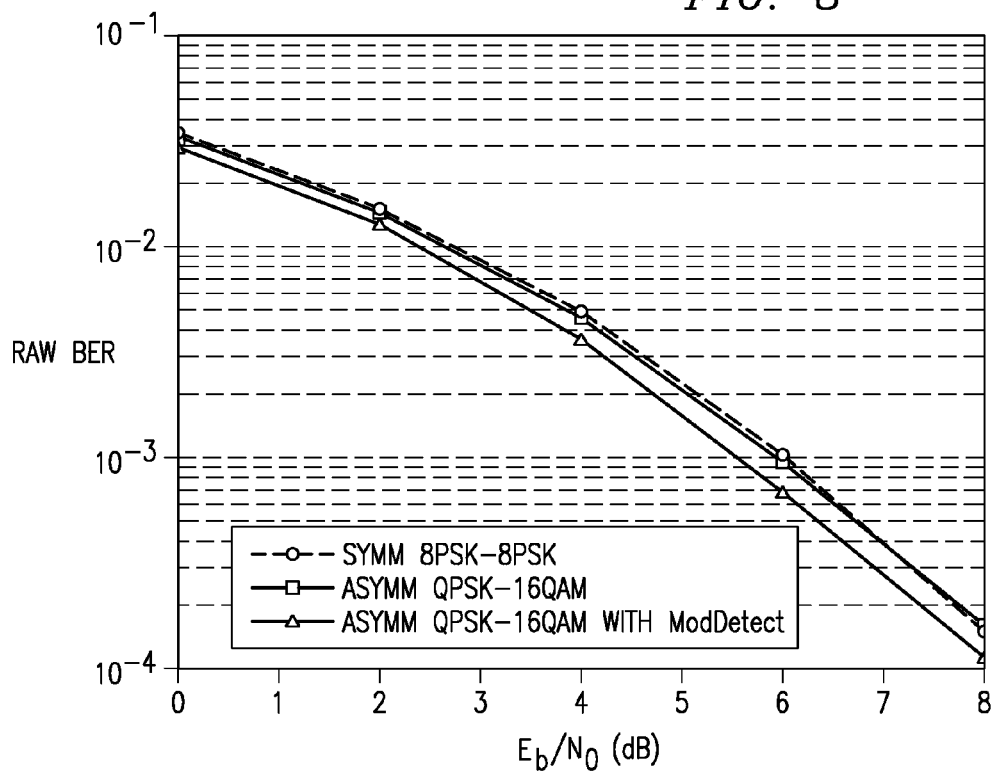

FIGS. 8-9 show comparisons of both STTD encoding 8-PSK with one STTD encoding QPSK and the other 16-QAM (i.e., spatial asymmetry) for an ID channel and for channel B, respectively. Note "ModDetect" means the modified iterative detector in which instead of using the post-detection symbol SINR, use the MSE scaled by the average symbol energy.

9. Modifications

The preferred embodiments can be modified in various ways while retaining the features of linear transformation of symbols prior to transmission and/or symmetrical symbol mapping.

For example, the receiver could have the linear transformation provided by the transmitter and thereby avoid the computation; the STTD could be 3×3 or larger; the asymmetric symbol encoding could also apply to general multiple input, multiple output (MIMO) systems; . . .

What is claimed is:

1. A method of transmitting, comprising:
   (a) providing a first symbol stream to a first encoder at a first time;
   (b) providing a second symbol stream to a second encoder at the first time;
   (c) encoding the first symbol stream to produce streams $x_1$, $x_2$;
   (d) encoding the second symbol stream to produce streams $x_3$, $x_4$;
   (e) linearly transforming the streams $x_1$, $x_2$, $x_3$, $x_4$ by a permutation of said streams $x_1$, $x_2$, $x_3$, $x_4$ in response to estimated channel coefficients, wherein said permutation changes the order of symbols in streams $x_1$, $x_2$, $x_3$, $x_4$; and
   (f) transmitting the linearly transformed streams $x_1$, $x_2$, $x_3$, $x_4$ to a recipient.

2. The method of claim 1, wherein the linearly transforming of step (e) comprises selection from a finite set of linear transformations.

3. The method of claim 1, wherein the linearly transforming of step (e) is responsive to parameters arising from transforming a channel from the recipient of the transmitting of step (f), said transforming a channel approximates an independent, identically distributed or uncorrelated channel.

4. The method of claim 1, wherein the linearly transforming of step (e) is with a P×P matrix W determined by combinations of estimations of the elements of the matrix $R_{TX}=W^H R_{TX} W$.

5. The method of claim 4, wherein the elements of W are quantized.

6. The method of claim 1, wherein the estimated channel coefficients are estimated with pilot symbols from said recipient.

7. The method of claim 1, wherein the first and second symbol streams are orthogonal frequency division multiplexing (OFDM) symbol streams.

8. A method of transmitting, comprising:
   (a) providing symbol streams $s_1$, $s_2$ to a serial-to-parallel converter and producing symbol stream $s_1$, $s_2$ in parallel;
   (b) providing symbol stream $s_1$ to a first space-time transmit diversity encoder at a first time;
   (c) providing space-time transmit diversity encoded stream $s_{1,1}$, $s_{1,2}$, $-s_{1,2}^*$, $s_{1,1}^*$ from said first space-time transmit diversity encoder;
   (d) providing symbol stream $s_2$ to a second space-time transmit diversity encoder at the first time;

(e) providing space-time transmit diversity encoded stream $s_{2,3}, s_{2,4}, -s_{2,4}^*, s_{2,3}^*$ from said second space-time transmit diversity encoder, wherein said stream $s_2$ is different from said stream $s_1$;

(f) linearly transforming said $s_{1,1}, s_{1,2}, -s_{1,2}^*, s_{1,1}^*$ and $s_{2,3}, s_{2,4}, -s_{2,4}^*, s_{2,3}^*$ by a permutation of said $s_{1,1}, s_{1,2}, -s_{1,2}^*, s_{1,1}^*$ and $s_{2,3}, s_{2,4}, -s_{2,4}^*, s_{2,3}^*$ in response to estimated channel coefficients, wherein said permutation changes the order of symbols in streams $s_{1,1}, s_{1,2}, -s_{1,2}^*, s_{1,1}^*$ and $s_{2,3}, s_{2,4}, -s_{2,4}^*, s_{2,3}^*$; and (g) transmitting said linearly transformed $s_{1,1}, s_{1,2}, -s_{1,2}^*, s_{1,1}^*$ and $s_{2,3}, s_{2,4}, -s_{2,4}^*, s_{2,3}^*$.

9. The method of claim 8, wherein said linearly transforming step (f) is selection from a finite set of linear transformations.

10. The method of claim 8, wherein said symbol streams $s_{1,1}, s_{1,2}, -s_{1,2}^*, s_{1,1}^*$ and $s_{2,3}, s_{2,4}, -s_{2,4}^*, s_{2,3}^*$ are orthogonal frequency division multiplexing (OFDM) symbol streams.

11. The method of claim 8, wherein said linearly transforming step (f) is a weighted permutation of said $s_{1,1}, s_{1,2}, -s_{1,2}^*, s_{1,1}^*$ and $s_{2,3}, s_{2,4}, -s_{2,4}^*, s_{2,3}^*$.

12. The method of claim 8, wherein said linearly transforming step (f) is with parameters provided by a recipient of said transmitting of step (g) of claim 8.

13. The method of claim 12, wherein said recipient provides said parameters via a feedback channel.

14. The method of claim 8, wherein said linearly transforming step (f) is with parameters derived from receipt of signals from a recipient of said transmitting of step (g) of claim 8.

15. The method of claim 14, comprising transmitting said parameters to said recipient via a signaling channel.

16. The method of claim 8, wherein said linearly transforming step (f) is with parameters arising from transforming a channel from a recipient of said transmitting of step (g) of claim 8, said transforming a channel approximates an independent, identically distributed or uncorrelated channel.

* * * * *